US012771837B2

(12) United States Patent
Heo et al.

(10) Patent No.: US 12,771,837 B2
(45) Date of Patent: Oct. 20, 2026

(54) METHOD AND APPARATUS FOR ENCODING/DECODING IMAGE AND RECORDING MEDIUM FOR STORING BITSTREAM

(71) Applicants: HYUNDAI MOTOR COMPANY, Seoul (KR); KIA CORPORATION, Seoul (KR)

(72) Inventors: Jin Heo, Hwaseong-si (KR); Seung Wook Park, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/845,196

(22) PCT Filed: Apr. 5, 2023

(86) PCT No.: PCT/KR2023/004579

§ 371 (c)(1),
(2) Date: Sep. 9, 2024

(87) PCT Pub. No.: WO2023/195765

PCT Pub. Date: Oct. 12, 2023

(65) Prior Publication Data

US 2025/0193393 A1 Jun. 12, 2025

(30) Foreign Application Priority Data

Apr. 7, 2022 (KR) ........................ 10-2022-0043214
Apr. 5, 2023 (KR) ........................ 10-2023-0044609

(51) Int. Cl.
*H04N 19/119* (2014.01)
*H04N 19/176* (2014.01)
(Continued)

(52) U.S. Cl.
CPC ......... *H04N 19/119* (2014.11); *H04N 19/176* (2014.11); *H04N 19/46* (2014.11); *H04N 19/96* (2014.11)

(58) Field of Classification Search
None
See application file for complete search history.

(56) References Cited

U.S. PATENT DOCUMENTS

2013/0202030 A1* 8/2013 Song .................... H04N 19/139
375/240.03
2022/0070475 A1* 3/2022 Lee ...................... H04N 19/105
2022/0086441 A1 3/2022 Zhang et al.

FOREIGN PATENT DOCUMENTS

KR 2019-0046704 A 5/2019
KR 2020-0071302 A 6/2020
(Continued)

OTHER PUBLICATIONS

International Search Report and Written Opinion for Int. App. No. PCT/KR2023/004579, mailed Jul. 7, 2023.

*Primary Examiner* — Nam D Pham
(74) *Attorney, Agent, or Firm* — MCDONNELL BOEHNEN HULBERT & BERGHOFF LLP

(57) ABSTRACT

A video decoding method comprises determining a tree structure for splitting a current block among candidate tree structures allowed for the current block, based on a block splitting information obtained from a bitstream, splitting the current block according to the determined tree structure, and decoding a sub block of the current block split from the current block. The candidate tree structures comprise a geometric splitting tree structure, and the geometric splitting tree structure comprises at least one of a triangle quad tree structure, a geometric binary tree structure or an asymmetric ternary tree structure.

17 Claims, 21 Drawing Sheets

(51) Int. Cl.
*H04N 19/46* (2014.01)
*H04N 19/96* (2014.01)

(56) References Cited

FOREIGN PATENT DOCUMENTS

| | | | |
|---|---|---|---|
| KR | 2020-0075775 | A | 6/2020 |
| KR | 2020-0108799 | A | 9/2020 |

* cited by examiner

METHOD AND APPARATUS FOR ENCODING/DECODING IMAGE AND RECORDING MEDIUM FOR STORING BITSTREAM

CROSS REFERENCE TO RELATED APPLICATIONS

The present application is a U.S. National Phase Application pursuant to 35 U.S.C. § 371 of International Application No. PCT/KR2023/004579 filed Apr. 5, 2023, which claims priority to Korean Patent Application No. 10-2022-0043214 filed Apr. 7, 2022 and Korean Patent Application No. 10-2023-0044609 filed Apr. 5, 2023. The entire disclosure contents of these applications are herewith incorporated by reference into the present application.

TECHNICAL FIELD

The present invention relates to an image encoding/decoding method and apparatus and a recording medium for storing a bitstream. More particularly, the present invention relates to an image encoding/decoding method and apparatus using block splitting according to a geometric splitting tree structure and a recording medium for storing a bitstream.

BACKGROUND ART

Recently, the demand for high-resolution, high-quality images such as ultra-high definition (UHD) images is increasing in various application fields. As image data becomes higher in resolution and quality, the amount of data increases relatively compared to existing image data. Therefore, when transmitting image data using media such as existing wired and wireless broadband lines or storing image data using existing storage media, the transmission and storage costs increase. In order to solve these problems that occur as image data becomes higher in resolution and quality, high-efficiency image encoding/decoding technology for images with higher resolution and quality is required.

In image encoding and decoding, for efficiency of prediction and transform, if samples predicted by the same prediction method are grouped into one block and the samples of the block are predicted and encoded by the same prediction method, encoding information of the prediction method of the sample may be greatly reduced. Therefore, in order to increase prediction accuracy of image samples, a method of precisely splitting an image into blocks according to the characteristics of the image is being discussed.

DISCLOSURE

Technical Problem

An object of the present invention is to provide an image encoding/decoding method and apparatus with improved encoding/decoding efficiency using splitting according to a geometric splitting tree structure.

Another object of the present invention is to provide a recording medium for storing a bitstream generated by an image decoding method or apparatus provided by the present invention.

Technical Solution

A video decoding method according to an embodiment of the present invention may comprise determining a tree structure for splitting a current block among candidate tree structures allowed for the current block, based on a block splitting information obtained from a bitstream, splitting the current block according to the determined tree structure, and decoding a sub block of the current block split from the current block.

According to an embodiment, the candidate tree structures may comprise a geometric splitting tree structure, and the geometric splitting tree structure may comprise at least one of a triangle quad tree structure, a geometric binary tree structure or an asymmetric ternary tree structure.

According to an embodiment, when the tree structure of the current block is a triangle quad tree structure, the current block may be split into four rectangle blocks with the same size.

According to an embodiment, the geometric binary tree structure may comprise a triangle binary tree structure and a rectangle binary tree structure.

According to an embodiment, when the tree structure of the current block is a triangle binary tree structure, the current block may be split into two triangle blocks with the same size.

According to an embodiment, when the tree structure of the current block is a rectangle binary tree structure, the current block may be split into two quadrangle blocks other than rectangle blocks.

According to an embodiment, when the tree structure of the current block is an asymmetric ternary tree structure, the current block may be split into two triangle blocks and one rectangle block.

According to an embodiment, the block splitting information may comprise a tringle quad tree flag indicating a method of splitting the current block among a rectangle quad tree structure and a triangle quad tree structure, a geometric binary tree flag indicating a method of splitting the current block among a rectangle binary tree structure and a geometric binary tree structure, and an asymmetric ternary tree flag indicating a method of splitting the current block among a rectangle ternary tree structure and an asymmetric ternary tree structure.

According to an embodiment, the block splitting information may comprise a quad tree flag indicating a method of splitting the current block among a quad tree structure and a multi-type tree structure, and the triangle quad tree flag may be obtained from the bitstream, when the quad tree flag indicates that the method of splitting the current block is a quad tree structure.

According to an embodiment, the block splitting information may comprise a binary tree flag indicating the method of splitting the current block among a binary tree structure and a ternary tree structure, the geometric binary tree flag may be obtained from the bitstream, when the binary tree flag indicates that the method of splitting the current block is a binary tree structure, and the asymmetric ternary tree flag may be obtained from the bitstream, when the binary tree flag indicates that the method of splitting the current block is a ternary tree structure.

According to an embodiment, the block splitting information may further comprise a GBT shape flag indicating the method of splitting the current block among a triangle binary tree structure and a rectangle binary tree structure, when the geometric binary tree flag indicates that the method of splitting the current block is a geometric binary tree structure, and a rectangle binary tree direction flag indicating a rectangle binary tree direction of the current block, when the GBT shape flag indicates that the method of splitting the current block is a rectangle binary tree structure.

According to an embodiment, the block splitting information may further comprise an asymmetric ternary tree direction flag indicating an asymmetric ternary tree direction of the current block, when the asymmetric ternary tree flag indicates that the method of splitting the current block is an asymmetric ternary tree structure.

According to an embodiment, the block splitting information may further comprise a split direction flag indicating a split direction of the current block among a vertical direction and a horizontal direction, when the binary tree structure or the ternary tree structure is applied to the current block, the binary tree structure applied to the current block may be determined according to the split direction of the current block, when the binary tree structure is applied to the current block, and the ternary tree structure applied to the current block may be determined according to the split direction of the current block, when the ternary tree structure is applied to the current block.

According to an embodiment, upon determining that the geometric splitting tree structure is not allowed for the current block in an upper data unit of the current block or the geometric splitting tree structure is not applied to the current block based on at least one of a size, shape, color component or slice type of the current block, the triangle quad tree flag, the geometric binary tree flag and the asymmetric ternary tree flag may not be obtained from the bitstream.

According to an embodiment, the decoding the sub block of the current block may comprise determining a plurality of transform regions from the current block according to a region of the sub block, when the current block is split according to the geometric splitting tree structure, reordering residual signals of a plurality of transform blocks corresponding to the current block in the plurality of transform regions, and determining a residual block including the residual signals of the current block by combining the plurality of transform regions.

According to an embodiment, the reordering the residual signals of the plurality of transform blocks corresponding to the current block in the plurality of transform regions may comprise scanning the residual signals of the plurality of transform blocks in a predetermined first scan order, and reordering the scanned residual signals in the plurality of transform regions in a predetermined second scan order.

According to an embodiment, the predetermined first scan order may be determined to be one of a vertical zigzag scan, a horizontal zigzag scan and a diagonal zigzag scan, and the predetermined second scan order may be determined to be one of a vertical zigzag scan, a horizontal zigzag scan and a diagonal zigzag scan.

According to an embodiment, the sub block may not be split in response to the geometric splitting tree structure being determined to be the tree structure of the current block.

A video encoding method according to an embodiment of the present invention may comprise determining a tree structure for splitting a current block among candidate tree structures allowed for the current block and encoding block splitting information indicating the tree structure, splitting the current block according to the determined tree structure, and encoding a sub block of the current block split from the current block.

A non-transitory computer-readable recording medium according to an embodiment of the present invention stores a bitstream generated by the video encoding method.

A transmission method according to an embodiment of the present invention transmits a bitstream generated by the video encoding method.

The features briefly summarized above with respect to the present disclosure are merely exemplary aspects of the detailed description below of the present disclosure, and do not limit the scope of the present disclosure.

Advantageous Effects

The present invention proposes a precisely splitting method of a block such as a coding unit according to a geometric splitting tree structure. As a block is split precisely, prediction accuracy is improved, thereby increasing encoding efficiency.

In addition, the present invention proposes a residual signal reordering method for transforming a block to which a geometric splitting tree structure is applied. According to residual signal reordering, transform efficiency of a block to which a geometric splitting tree structure is applied can be increased.

In addition, the present invention provides a syntax structure for determining a block splitting method reflecting a geometric splitting tree structure. According to the syntax structure provided in the present invention, various tree structures including a geometric splitting tree structure can be selected.

BEST MODE

Figure 1:
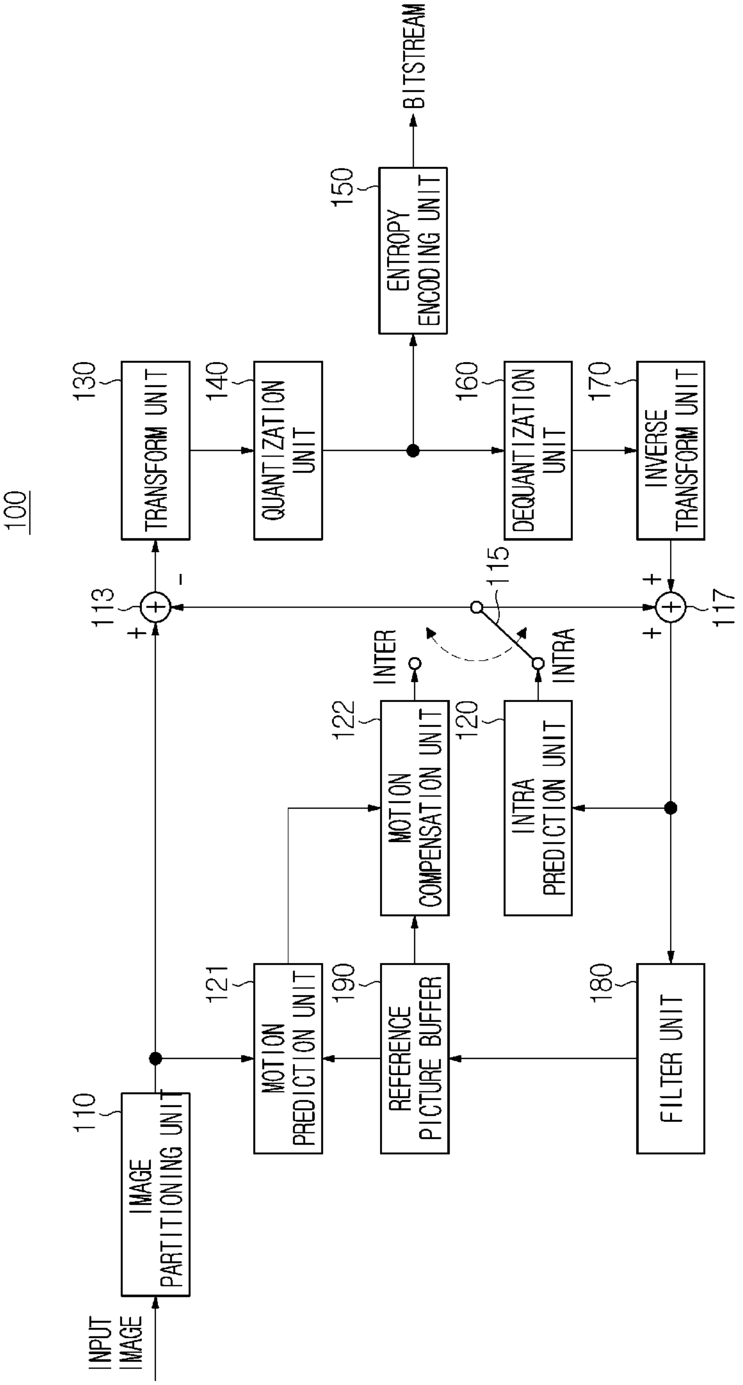
FIG. 1 is a block diagram showing a configuration of an encoding apparatus an embodiment of the present invention.

A video decoding method according to an embodiment of the present invention may comprise determining a tree structure for splitting a current block among candidate tree structures allowed for the current block, based on a block splitting information obtained from a bitstream, splitting the current block according to the determined tree structure, and decoding a sub block of the current block split from the current block.

MODE FOR INVENTION

The present invention may have various modifications and embodiments, and specific embodiments are illustrated in the drawings and described in detail in the detailed description. However, this is not intended to limit the present invention to specific embodiments, but should be understood to include all modifications, equivalents, or substitutes included in the spirit and technical scope of the present invention. Similar reference numerals in the drawings indicate the same or similar functions throughout various aspects. The shapes and sizes of elements in the drawings may be provided by way of example for a clearer description. The detailed description of the exemplary embodiments described below refers to the accompanying drawings, which illustrate specific embodiments by way of example. These embodiments are described in sufficient detail to enable those skilled in the art to practice the embodiments. It should be understood that the various embodiments are different from each other, but are not necessarily mutually exclusive. For example, specific shapes, structures, and characteristics described herein may be implemented in other embodiments without departing from the spirit and scope of the present invention with respect to one embodiment. It should also be understood that the positions or arrangements of individual components within each disclosed embodiment may be changed without departing from the spirit and scope of the embodiment. Accordingly, the detailed description set forth below is not intended to be limiting, and the scope of the exemplary embodiments is defined only by the appended claims, along with the full scope of equivalents to which such claims are entitled, if properly described.

In the present invention, the terms first, second, etc. may be used to describe various components, but the components should not be limited by the terms. The terms are only used for the purpose of distinguishing one component from another. For example, without departing from the scope of the present invention, the first component may be referred to as the second component, and similarly, the second component may also be referred to as the first component. The term and/or includes a combination of a plurality of related described items or any item among a plurality of related described items.

The components shown in the embodiments of the present invention are independently depicted to indicate different characteristic functions, and do not mean that each component is formed as a separate hardware or software configuration unit. That is, each component is listed and included as a separate component for convenience of explanation, and at least two of the components may be combined to form a single component, or one component may be divided into multiple components to perform a function, and embodiments in which components are integrated and embodiments in which each component is divided are also included in the scope of the present invention as long as they do not deviate from the essence of the present invention.

The terminology used in the present invention is only used to describe specific embodiments and is not intended to limit the present invention. The singular expression includes the plural expression unless the context clearly indicates some components of the present otherwise. In addition, invention are not essential components that perform essential functions in the present invention and may be optional components only for improving performance. The present invention may be implemented by including only essential components for implementing the essence of the present invention excluding components only used for improving performance, and a structure including only essential components excluding optional components only used for improving performance is also included in the scope of the present invention.

In an embodiment, the term "at least one" may mean one of a number greater than or equal to 1, such as 1, 2, 3, and 4. In an embodiment, the term "a plurality of" may mean one of a number greater than or equal to 2, such as 2, 3, and 4.

Hereinafter, embodiments of the present invention will be specifically described with reference to the drawings. In describing the embodiments of this specification, if it is determined that a detailed description of a related known configuration or function may obscure the subject matter of this specification, the detailed description will be omitted, and the same reference numerals will be used for the same components in the drawings, and repeated descriptions of the same components will be omitted.

DESCRIPTION OF TERMS

Hereinafter, "image" may mean one picture constituting a video, and may also refer to the video itself. For example, "encoding and/or decoding of an image" may mean "encoding and/or decoding of a video," and may also mean "encoding and/or decoding of one of images constituting the video."

Hereinafter, "moving image" and "video" may be used with the same meaning and may be used interchangeably. In addition, a target image may be an encoding target image that is a target of encoding and/or a decoding target image that is a target of decoding. In addition, the target image may be an input image input to an encoding apparatus and may be an input image input to a decoding apparatus. Here, the target image may have the same meaning as a current image.

Hereinafter, “image”, “picture”, “frame” and “screen” may be used with the same meaning and may be used interchangeably.

Hereinafter, a “target block” may be an encoding target block that is a target of encoding and/or a decoding target block that is a target of decoding. In addition, the target block may be a current block that is a target of current encoding and/or decoding. For example, “target block” and “current block” may be used with the same meaning and may be used interchangeably.

Hereinafter, “block” and “unit” may be used with the same meaning and may be used interchangeably. In addition, “unit” may mean including a luma component block and a chroma component block corresponding thereto in order to distinguish it from a block. For example, a coding tree unit (CTU) may be composed of one luma component (Y) coding tree block (CTB) and two chroma component (Cb, Cr) coding tree blocks related to it.

Hereinafter, “sample”, “picture element” and “pixel” may be used with the same meaning and may be used interchangeably. Herein, a sample may represent a basic unit that constitutes a block.

Hereinafter, “inter” and “inter-screen” may be used with the same meaning and can be used interchangeably.

Hereinafter, “intra” and “in-screen” may be used with the same meaning and can be used interchangeably.

FIG. 1 is a block diagram showing a configuration of an encoding apparatus according to an embodiment of the present invention.

The encoding apparatus 100 may be an encoder, a video encoding apparatus, or an image encoding apparatus. A video may include one or more images. The encoding apparatus 100 may sequentially encode one or more images.

Referring to FIG. 1, the encoding apparatus 100 may include an image partitioning unit 110, an intra prediction unit 120, a motion prediction unit 121, a motion compensation unit 122, a switch 115, a subtractor 125, a transform unit 130, a quantization unit 140, an entropy encoding unit 150, a dequantization unit 160, an inverse transform unit 170, an adder 117, a filter unit 180 and a reference picture buffer 190.

In addition, the encoding apparatus 100 may generate a bitstream including information encoded through encoding of an input image, and output the generated bitstream. The generated bitstream may be stored in a computer-readable recording medium, or may be streamed through a wired/wireless transmission medium.

The image partitioning unit 110 may partition the input image into various forms to increase the efficiency of video encoding/decoding. That is, the input video is composed of multiple pictures, and one picture may be hierarchically partitioned and processed for compression efficiency, parallel processing, etc. For example, one picture may be partitioned into one or multiple tiles or slices, and then partitioned again into multiple CTUs (Coding Tree Units). Alternatively, one picture may first be partitioned into multiple sub-pictures defined as groups of rectangular slices, and each sub-picture may be partitioned into the tiles/slices. Here, the sub-picture may be utilized to support the function of partially independently encoding/decoding and transmitting the picture. Since multiple sub-pictures may be individually reconstructed, it has the advantage of easy editing in applications that configure multi-channel inputs into one picture. In addition, a tile may be divided horizontally to generate bricks. Here, the brick may be utilized as the basic unit of parallel processing within the picture. In addition, one CTU may be recursively partitioned into quad trees (QTs), and the terminal node of the partition may be defined as a CU (Coding Unit). The CU may be partitioned into a PU (Prediction Unit), which is a prediction unit, and a TU (Transform Unit), which is a transform unit, to perform prediction and partition. Meanwhile, the CU may be utilized as the prediction unit and/or the transform unit itself. Here, for flexible partition, each CTU may be recursively partitioned into multi-type trees (MTTs) as well as quad trees (QTs). The partition of the CTU into multi-type trees may start from the terminal node of the QT, and the MTT may be composed of a binary tree (BT) and a triple tree (TT). For example, the MTT structure may be classified into a vertical binary split mode (SPLIT_BT_VER), a horizontal binary split mode (SPLIT_BT_HOR), a vertical ternary split mode (SPLIT TT VER), and a horizontal ternary split mode (SPLIT TT HOR). In addition, a minimum block size (MinQTSize) of the quad tree of the luma block during partition may be set to 16×16, a maximum block size (MaxBtSize) of the binary tree may be set to 128×128, and a maximum block size (MaxTtSize) of the triple tree may be set to 64×64. In addition, a minimum block size (MinBtSize) of the binary tree and a minimum block size (MinTtSize) of the triple tree may be specified as 4×4, and the maximum depth (MaxMttDepth) of the multi-type tree may be specified as 4. In addition, in order to increase the encoding efficiency of the I slice, a dual tree that differently uses CTU partition structures of luma and chroma components may be applied. The above quad-tree structure may include a rectangular quad-tree structure and a triangular quad-tree tree structure to which geometric partitioning is applied. And the above ternary tree structure may include a rectangular ternary tree structure and an asymmetric ternary tree structure to which geometric partitioning is applied. The above binary tree structure may include a rectangular binary tree structure and a geometric binary tree structure to which geometric partitioning is applied.

On the other hand, in P and B slices, the luma and chroma CTBs (Coding Tree Blocks) within the CTU may be partitioned into a single tree that shares the coding tree structure.

The encoding apparatus 100 may perform encoding on the input image in the intra mode and/or the inter mode. Alternatively, the encoding apparatus 100 may perform encoding on the input image in a third mode (e.g., IBC mode, Palette mode, etc.) other than the intra mode and the inter mode. However, if the third mode has functional characteristics similar to the intra mode or the inter mode, it may be classified as the intra mode or the inter mode for convenience of explanation. In the present invention, the third mode will be classified and described separately only when a specific description thereof is required.

When the intra mode is used as the prediction mode, the switch 115 may be switched to intra, and when the inter mode is used as the prediction mode, the switch 115 may be switched to inter. Here, the intra mode may mean an intra prediction mode, and the inter mode may mean an inter prediction mode. The encoding apparatus 100 may generate a prediction block for an input block of the input image. In addition, the encoding apparatus 100 may encode a residual block using a residual of the input block and the prediction block after the prediction block is generated. The input image may be referred to as a current image which is a current encoding target. The input block may be referred to as a current block which is a current encoding target or an encoding target block.

When a prediction mode is an intra mode, the intra prediction unit 120 may use a sample of a block that has been already encoded/decoded around a current block as a reference sample. The intra prediction unit 120 may perform spatial prediction for the current block by using the reference sample, or generate prediction samples of an input block through spatial prediction. Herein, the intra prediction may mean intra prediction.

As an intra prediction method, non-directional prediction modes such as DC mode and Planar mode and directional prediction modes (e.g., 65 directions) may be applied. Here, the intra prediction method may be expressed as an intra prediction mode or an intra prediction mode.

When a prediction mode is an inter mode, the motion prediction unit 111 may retrieve a region that best matches with an input block from a reference image in a motion prediction process, and derive a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit may generate a prediction block of the current block by performing motion compensation using a motion vector. Herein, inter prediction may mean inter prediction or motion compensation.

When the value of the motion vector is not an integer, the motion prediction unit 111 and the motion compensation unit 112 may generate the prediction block by applying an interpolation filter to a partial region of the reference picture. In order to perform inter prediction or motion compensation, it may be determined whether the motion prediction and motion compensation mode of the prediction unit included in the coding unit is one of a skip mode, a merge mode, an advanced motion vector prediction (AMVP) mode, and an intra block copy (IBC) mode based on the coding unit and inter prediction or motion compensation may be performed according to each mode.

In addition, based on the above inter prediction method, an AFFINE mode of sub-PU based prediction, an SbTMVP (Subblock-based Temporal Motion Vector Prediction) mode, an MMVD (Merge with MVD) mode of PU-based prediction, and a GPM (Geometric Partitioning Mode) mode may be applied. In addition, in order to improve the performance of each mode, HMVP (History based MVP), PAMVP (Pairwise Average MVP), CIIP (Combined Intra/Inter Prediction), AMVR (Adaptive Motion Vector Resolution), BDOF (Bi-Directional Optical-Flow), BCW (Bi-predictive with CU Weights), LIC (Local Illumination Compensation), TM (Template Matching), OBMC (Overlapped Block Motion Compensation), etc. may be applied.

The subtractor 113 may generate a residual block by using a difference between an input block and a prediction block. The residual block may be called a residual signal. The residual signal may mean a difference between an original signal and a prediction signal. Alternatively, the residual signal may be a signal generated by transforming or quantizing, or transforming and quantizing a difference between the original signal and the prediction signal. The residual block may be a residual signal of a block unit.

The transform unit 130 may generate a transform coefficient by performing transform on a residual block, and output the generated transform coefficient. Herein, the transform coefficient may be a coefficient value generated by performing transform on the residual block. When a transform skip mode is applied, the transform unit 130 may skip transform of the residual block.

A quantized level may be generated by applying quantization to the transform coefficient or to the residual signal. Hereinafter, the quantized level may also be called a transform coefficient in embodiments.

For example, a 4×4 luma residual block generated through intra prediction is transformed using a base vector based on DST (Discrete Sine Transform), and transform may be performed on the remaining residual block using a base vector based on DCT (Discrete Cosine Transform). In addition, a transform block is partitioned into a quad tree shape for one block using RQT (Residual Quad Tree) technology, and after performing transform and quantization on each transformed block partitioned through RQT, a coded block flag (chf) may be transmitted to increase encoding efficiency when all coefficients become 0.

As another alternative, the Multiple Transform Selection (MTS) technique, which selectively uses multiple transform bases to perform transform, may be applied. That is, instead of partitioning a CU into TUs through RQT, a function similar to TU partition may be performed through the sub-block Transform (SBT) technique. Specifically, SBT is applied only to inter prediction blocks, and unlike RQT, the current block may be partitioned into 1 or 14 sizes in the vertical or horizontal direction and then transform may be performed on only one of the blocks. For example, if it is partitioned vertically, transform may be performed on the leftmost or rightmost block, and if it is partitioned horizontally, transform may be performed on the topmost or bottommost block.

In addition, LENST (LOW Frequency Non-Separable Transform), a secondary transform technique that additionally transforms the residual signal transformed into the frequency domain through DCT or DST, may be applied. LFNST additionally performs transform on the low-frequency region of 4×4 or 8×8 in the upper left, so that the residual coefficients may be concentrated in the upper left.

The quantization unit 140 may generate a quantized level by quantizing the transform coefficient or the residual signal according to a quantization parameter (QP), and output the generated quantized level. Herein, the quantization unit 140 may quantize the transform coefficient by using a quantization matrix.

For example, a quantizer using QP values of 0 to 51 may be used. Alternatively, if the image size is larger and high encoding efficiency is required, the QP of 0 to 63 may be used. Also, a DQ (Dependent Quantization) method using two quantizers instead of one quantizer may be applied. DQ performs quantization using two quantizers (e.g., Q0 and Q1), but even without signaling information about the use of a specific quantizer, the quantizer to be used for the next transform coefficient may be selected based on the current state through a state transition model.

The entropy encoding unit 150 may generate a bitstream by performing entropy encoding according to a probability distribution on values calculated by the quantization unit 140 or on coding parameter values calculated when performing encoding, and output the bitstream. The entropy encoding unit 150 may perform entropy encoding of information on a sample of an image and information for decoding an image. For example, the information for decoding the image may include a syntax element.

When entropy encoding is applied, symbols are represented so that a smaller number of bits are assigned to a symbol having a high occurrence probability and a larger number of bits are assigned to a symbol having a low occurrence probability, and thus, the size of bit stream for symbols to be encoded may be decreased. The entropy encoding unit 150 may use an encoding method, such as exponential Golomb, context-adaptive variable length coding (CAVLC), context-adaptive binary arithmetic coding (CABAC), etc., for entropy encoding. For example, the entropy encoding unit 150 may perform entropy encoding by using a variable length coding/code (VLC) table. In addition, the entropy encoding unit 150 may derive a binarization method of a target symbol and a probability model of a target symbol/bin, and perform arithmetic coding by using the derived binarization method, and a context model.

In relation to this, when applying CABAC, in order to reduce the size of the probability table stored in the decoding apparatus, a table probability update method may be changed to a table update method using a simple equation and applied. In addition, two different probability models may be used to obtain more accurate symbol probability values.

In order to encode a transform coefficient level (quantized level), the entropy encoding unit 150 may change a two-dimensional block form coefficient into a one-dimensional vector form through a transform coefficient scanning method. A coding parameter may include information (flag, index, etc.) encoded in the encoding apparatus 100 and signaled to the decoding apparatus 200, such as syntax element, and information derived in the encoding or decoding process, and may mean information required when encoding or decoding an image.

Herein, signaling the flag or index may mean that a corresponding flag or index is entropy encoded and included in a bitstream in an encoder, and may mean that the corresponding flag or index is entropy decoded from a bitstream in a decoder.

The encoded current image may be used as a reference image for another image to be processed later. Therefore, the encoding apparatus 100 may reconstruct or decode the encoded current image again and store the reconstructed or decoded image as a reference image in the reference picture buffer 190.

A quantized level may be dequantized in the dequantization unit 160, or may be inversely transformed in the inverse transform unit 170. A dequantized and/or inversely transformed coefficient may be added with a prediction block the adder 117. Herein, the dequantized and/or through inversely transformed coefficient may mean a coefficient on which at least one of dequantization and inverse transform is performed, and may mean a reconstructed residual block. The dequantization unit 160 and the inverse transform unit 170 may be performed as an inverse process of the quantization unit 140 and the transform unit 130.

The reconstructed block may pass through the filter unit 180. The filter unit 180 may apply a deblocking filter, a sample adaptive offset (SAO), an adaptive loop filter (ALF), a bilateral filter (BIF), luma mapping with chroma scaling (LMCS), etc. to a reconstructed sample, a reconstructed block or a reconstructed image using all or some filtering techniques. The filter unit 180 may be called an in-loop filter. In this case, the in-loop filter is also used as name excluding LMCS.

The deblocking filter may remove block distortion generated in boundaries between blocks. In order to determine whether or not to apply a deblocking filter, whether or not to apply a deblocking filter to a current block may be determined based on samples included in several rows or columns which are included in the block. When a deblocking filter is applied to a block, a different filter may be applied according to a required deblocking filtering strength.

In order to compensate for encoding error using sample adaptive offset, a proper offset value may be added to a sample value. The sample adaptive offset may correct an offset of a deblocked image from an original image by a sample unit. A method of partitioning a sample included in an image into a predetermined number of regions, determining a region to which an offset is applied, and applying the offset to the determined region, or a method of applying an offset in consideration of edge information on each sample may be used.

A bilateral filter (BIF) may also correct the offset from the original image on a sample-by-sample basis for the image on which deblocking has been performed.

The adaptive loop filter may perform filtering based on a comparison result of the reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the adaptive loop filter to be applied to each block may vary.

In LMCS (Luma Mapping with Chroma Scaling), luma mapping (LM) means remapping luma values through a piece-wise linear model, and chroma scaling (CS) means a technique for scaling the residual value of the chroma component according to the average luma value of the prediction signal. In particular, LMCS may be utilized as an HDR correction technique that reflects the characteristics of HDR (High Dynamic Range) images.

The reconstructed block or the reconstructed image having passed through the filter unit 180 may be stored in the reference picture buffer 190. A reconstructed block that has passed through the filter unit 180 may be a part of a reference image. That is, the reference image is a reconstructed image composed of reconstructed blocks that have passed through the filter unit 180. The stored reference image may be used later in inter prediction or motion compensation.

Figure 2:
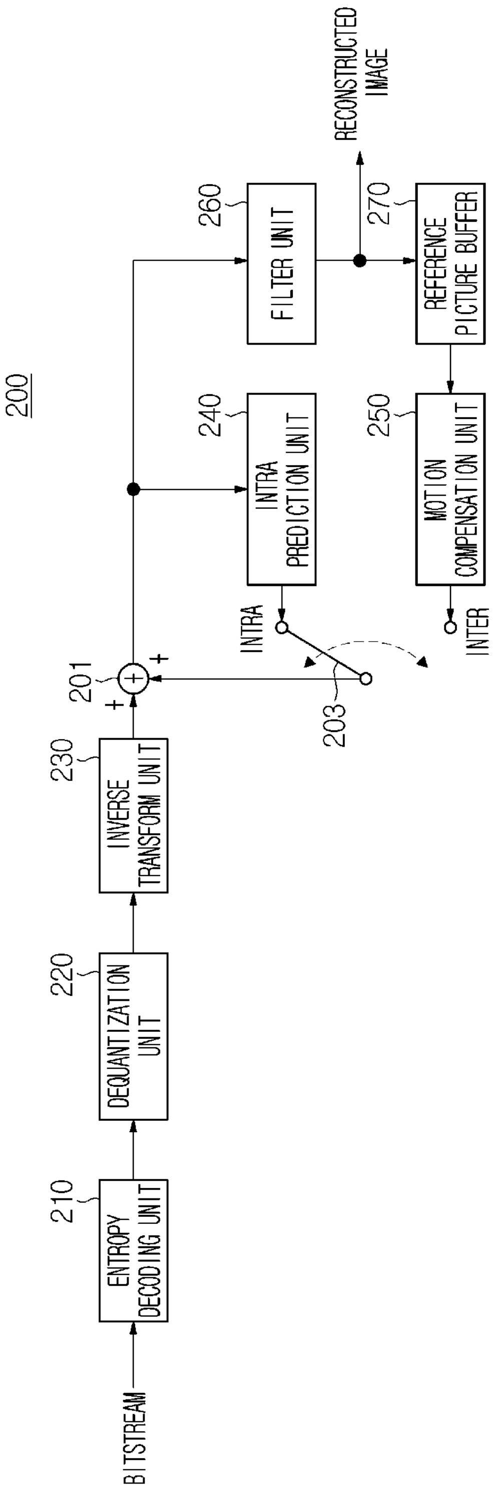
FIG. 2 is a block diagram showing a configuration of a decoding apparatus according to an embodiment of the present invention.

FIG. 2 is a block diagram showing a configuration of a decoding apparatus according to an embodiment of the present invention.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse transform unit 230, an intra prediction unit 240, a motion compensation unit 250, an adder 201, a switch 203, a filter unit 260, and a reference picture buffer 270.

The decoding apparatus 200 may receive a bitstream output from the encoding apparatus 100. The decoding apparatus 200 may receive a bitstream stored in a computer-readable recording medium, or may receive a bitstream that is streamed through a wired/wireless transmission medium. The decoding apparatus 200 may decode the bitstream in an intra mode or an inter mode. In addition, the decoding apparatus 200 may generate a reconstructed image generated through decoding or a decoded image, and output the reconstructed image or decoded image.

When a prediction mode used for decoding is an intra mode, the switch 20 may be switched to intra. Alternatively, when a prediction mode used for decoding is an inter mode, the switch 203 may be switched to inter.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block and the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse process of the entropy encoding method described above.

The entropy decoding unit 210 may change a one-dimensional vector-shaped coefficient into a two-dimensional block-shaped coefficient through a transform coefficient scanning method to decode a transform coefficient level (quantized level).

A quantized level may be dequantized in the dequantization unit 220, or inversely transformed in the inverse transform unit 230. The quantized level may be a result of dequantization and/or inverse transform, and may be generated as a reconstructed residual block. Herein, the dequantization unit 220 may apply a quantization matrix to the quantized level. The dequantization unit 220 and the inverse transform unit 230 applied to the decoding apparatus may apply the same technology as the dequantization unit 160 and inverse transform unit 170 applied to the aforementioned encoding apparatus.

When an intra mode is used, the intra prediction unit 240 may generate a prediction block by performing, on the current block, spatial prediction that uses a sample value of a block which has been already decoded around a decoding target block. The intra prediction unit 240 applied to the decoding apparatus may apply the same technology as the intra prediction unit 120 applied to the aforementioned encoding apparatus.

When an inter mode is used, the motion compensation unit 250 may generate a prediction block by performing, on the current block, motion compensation that uses a motion vector and a reference image stored in the reference picture buffer 270. The motion compensation unit 250 may generate a prediction block by applying an interpolation filter to a partial region within a reference image when the value of the motion vector is not an integer value. In order to perform motion compensation, it may be determined whether the motion compensation method of the prediction unit included in the corresponding coding unit is a skip mode, a merge mode, an AMVP mode, or a current picture reference mode based on the coding unit, and motion compensation may be performed according to each mode. The motion compensation unit 250 applied to the decoding s may apply the same technology as the motion compensation unit 122 applied to the encoding apparatus described above.

The adder 201 may generate a reconstructed block by adding the reconstructed residual block and the prediction block. The filter unit 260 may apply at least one of inverse-LMCS, a deblocking filter, a sample adaptive offset, and an adaptive loop filter to the reconstructed block or reconstructed image. The filter unit 260 applied to the decoding apparatus may apply the same filtering technology as that applied to the unit 180 applied to the aforementioned encoding apparatus.

The filter unit 260 may output the reconstructed image. The reconstructed block or reconstructed image may be stored in the reference picture buffer 270 and used for inter prediction. A reconstructed block that has passed through the filter unit 260 may be a part of a reference image. That is, a reference image may be a reconstructed image composed of reconstructed blocks that have passed through the filter unit 260. The stored reference image may be used later in inter prediction or motion compensation.

Figure 3:
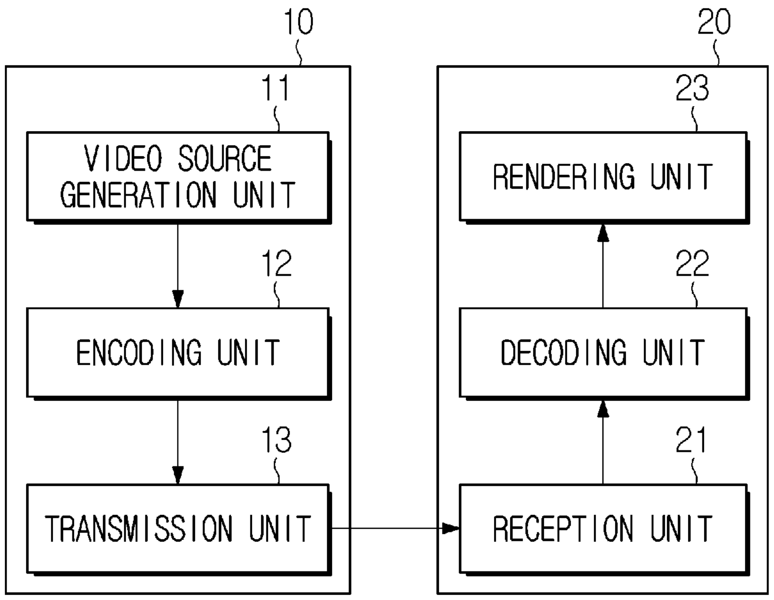
FIG. 3 is a diagram schematically showing a video coding system to which the present invention is applicable.

FIG. 3 is a diagram schematically showing a video coding system to which the present invention is applicable.

A video coding system according to an embodiment may include an encoding apparatus 10 and a decoding apparatus 20. The encoding apparatus 10 may transmit encoded video and/or image information or data to the decoding apparatus 20 in the form of a file or streaming through a digital storage medium or a network.

The encoding apparatus 10 according to an embodiment may include a video source generation unit 11, an encoding unit 12, a transmission unit 13. The decoding apparatus 20 according to an embodiment may include a reception unit 21, a decoding unit 22, and a rendering unit 23. The encoding unit 12 may be called a video/image encoding unit, and the decoding unit 22 may be called a video/image decoding unit. The transmission unit 13 may be included in the encoding unit 12. The reception unit 21 may be included in the decoding unit 22. The rendering unit 23 may include a display unit, and the display unit may be configured as a separate device or an external component.

The video source generation unit 11 may obtain the video/image through a process of capturing, synthesizing, or generating the video/image. The video source generation unit 11 may include a video/image capture device and/or a video/image generation device. The video/image capture device may include, for example, one or more cameras, a video/image archive including previously captured video/image, etc. The video/image generation device may include, for example, a computer, a tablet, and a smartphone, etc., and may (electronically) generate the video/image. For example, a virtual video/image may be generated through a computer, etc., in which case the video/image capture process may be replaced with a process of generating related data.

The encoding unit 12 may encode the input video/image. The encoding unit 12 may perform a series of procedures such as prediction, transform, and quantization for compression and encoding efficiency. The encoding unit 12 may output encoded data (encoded video/image information) in the form of a bitstream. The detailed configuration of the encoding unit 12 may also be configured in the same manner as the encoding apparatus 100 of FIG. 1 described above.

The transmission unit 13 may transmit encoded video/image information or data output in the form of a bitstream to the reception unit 21 of the decoding apparatus 20 through a digital storage medium or a network in the form of a file or streaming. The digital storage medium may include various storage media such as USB, SD, CD, DVD, Blu-ray, HDD, SSD, etc. The transmission unit 13 may include an element for generating a media file through a predetermined file format and may include an element for transmission through a broadcasting/communication network. The reception unit 21 may extract/receive the bitstream from the storage medium or the network and transmit it to the decoding unit 22.

The decoding unit 22 may decode the video/image by performing a series of procedures such as dequantization, inverse transform, and prediction corresponding to the operation of the encoding unit 12. The detailed configuration of the decoding unit 22 may also be configured in the same manner as the above-described decoding apparatus 200 of FIG. 2.

The rendering unit 23 may render the decoded video/image. The rendered video/image may be displayed through the display unit.

According to one embodiment, a picture may be split into small regions during an encoding and decoding process. A picture may be split into sub-pictures, slices, tiles, or bricks. The sub-picture, slice, tile, or brick may be composed of multiple coding tree units (CTUs). The coding tree unit may be split into a quad tree (QT) or a multi-type tree (MTT) structure. Then, a coding unit (CU), which is a basic unit of coding, may be determined through splitting of the coding tree unit. Then, prediction, transform, quantization, etc. may be performed for each determined coding unit. Then, information necessary for image reconstruction may be encoded or decoded depending on the coding unit.

In the encoding and decoding process, the encoding and decoding process of the next coding unit may be sequentially performed based on the information of the reconstructed coding unit. When all coding units in one coding tree unit are encoded, encoding of the coding units in the next coding tree unit is performed in a predetermined scan order. Similarly, in the decoding process, when all coding units in one coding tree unit are decoded, decoding of the coding units in the next coding tree unit is performed in a predetermined scan order.

The coding tree unit may be set to have a uniform size. The coding tree unit is the top node in the splitting tree structure of the coding unit. The maximum size of the coding unit is the same as the size of the coding tree unit. Although the size of the coding tree unit is uniform, the split coding units within the coding tree unit may have various sizes. Also, the coding units may have a rectangular shape as well as a square shape depending on the splitting method.

According to one embodiment, the types of the splitting tree structure from the coding tree unit to the coding unit include a binary tree (BT) structure, a ternary tree (TT) structure, and a quad tree structure. Here, the multi-type tree structure includes a binary tree structure and a ternary tree structure. Hereinafter, FIG. 4 describes one embodiment of the splitting tree structure.

In the present disclosure, the binary tree structure represents a tree structure in which an upper block includes two sub blocks. In addition, in the present disclosure, the ternary tree structure represents a tree structure in which an upper block includes three sub blocks. In addition, in the present disclosure, the quad tree structure represents a tree structure in which an upper block includes four sub blocks.

Figure 4:
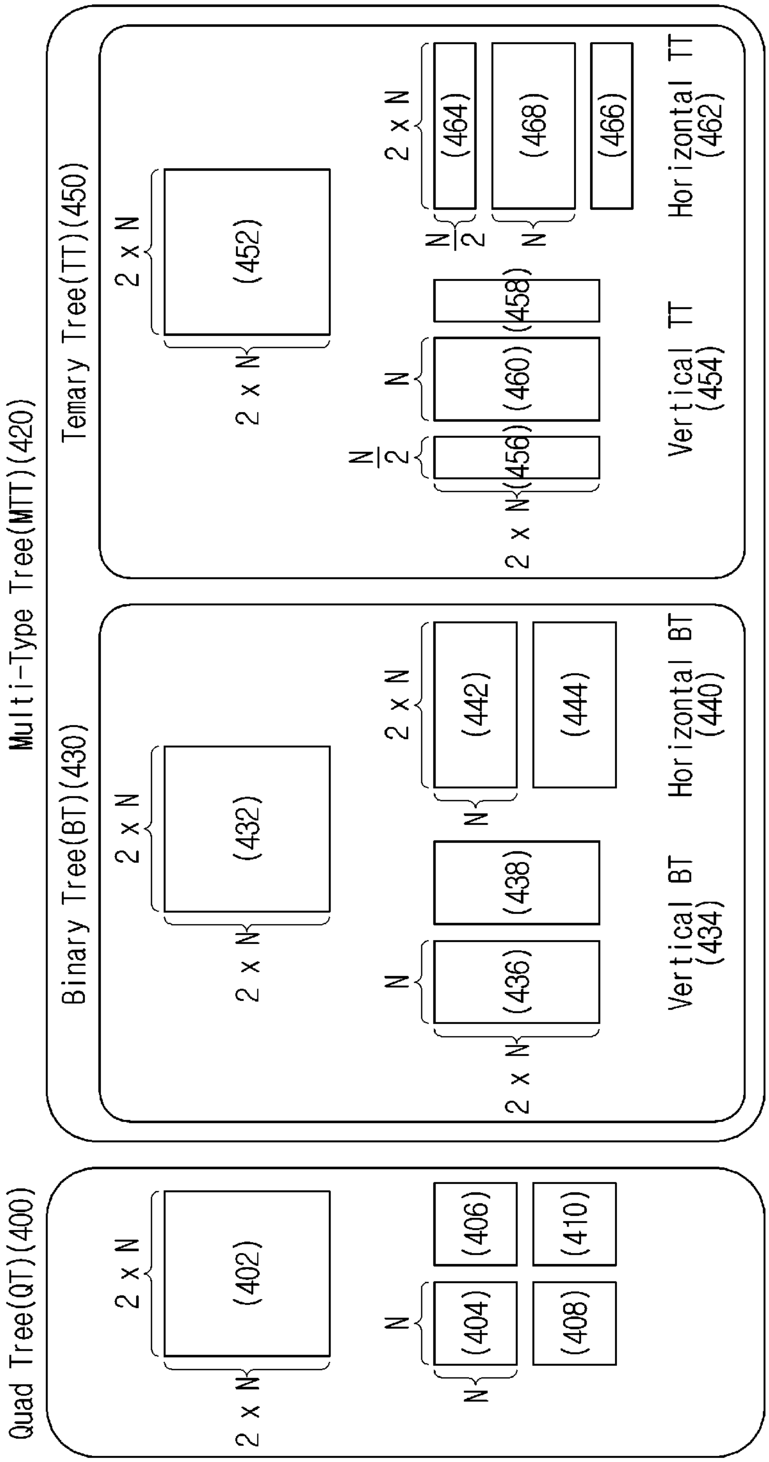
FIG. 4 shows an embodiment of a quad tree structure and a multi-type tree structure.

FIG. 4 shows an example of a quad tree structure, a multi-type tree structure.

In FIG. 4, the size of the upper block is defined as 2N×2N. The size of the sub block is explained based on the size of the upper block. The block may mean a coding unit, a prediction unit, a transform unit, or a data unit that plays a similar role. In addition, the upper block means a block to be split, and the sub block means a block generated by splitting the upper block.

According to a rectangle quad tree structure 400, the upper block 402 is split into four square-shaped blocks 404, 406, 408 and 410 with a size of N×N.

A multi-type tree structure 420 includes a rectangle binary tree structure 430 and a rectangle ternary tree structure 450. According to the rectangle binary tree structure 430, the upper block 432 is split into two rectangle blocks. Depending on the split direction, the rectangle binary tree structure 430 may include a vertical rectangle binary tree structure 434 and a horizontal rectangle binary tree structure 440. According to the vertical rectangle binary tree structure 434, the upper block 432 is split into two rectangle blocks 436 and 438 with a size of N×2N. In addition, according to the horizontal rectangle binary tree structure 440, the upper block 432 is split into two rectangle blocks 442 and 444 with a size of 2N×N.

In FIG. 4, an example is described in which a square block is split into rectangle binary tree structures. However, a rectangle block may be split according to a rectangle binary tree structure. For example, when the size of the upper block is 2N×N, the size of the split block may be N×N or 2N×N/2 depending on the split direction. Alternatively, when the size of the upper block is N×2N, the size of the split block may be N×N or N/2×2N depending on the split direction.

According to the rectangle ternary tree structure 450, the upper block 452 is split into three rectangle blocks. Depending on the split direction, the rectangle ternary tree structure 450 may include a vertical rectangle ternary tree structure 454 and a horizontal rectangle ternary tree structure 462. According to the vertical rectangle ternary tree structure 454, the upper block 452 is split into two rectangle blocks 456 and 458 with a size of N/2×2N and one rectangle block 460 with a size of N×2N. In addition, according to the horizontal rectangle ternary tree structure 462, the upper block 452 is split into two rectangle blocks 464 and 466 with a size of 2N×N/2 and one rectangle block 468 with a size of 2N×N.

In FIG. 4, an example is described in which a square block is split into a rectangle ternary tree structure. However, the rectangle block may be split according to a rectangle ternary tree structure. For example, when the size of the upper block is N×2N and is split by a horizontal rectangle ternary tree structure, the upper block may be split into one block with a size of N×N and two blocks with a size of N×N/2. Alternatively, when the size of the upper block is 2N×N and is split by a vertical rectangle ternary tree structure, the upper block may be split into one block with a size of N×N and two blocks with a size of N/2×N.

According to one embodiment, the coding tree unit may be recursively split within a predetermined size range by a rectangle quad tree structure. A lower coding unit split from the coding tree unit through the rectangle quad tree structure may be split by a rectangle binary tree structure and a rectangle ternary tree structure if a predetermined size condition is satisfied.

According to one embodiment, splitting according to a rectangle quad tree structure may no longer be applied to a coding unit determined due to splitting according to a multi-type tree structure. In addition, splitting according to a multi-type tree structure cannot be recursively applied to a coding unit.

According to one embodiment, transform may be performed based on the coding unit, splitting of which is completed. That is, transform may be performed based on the coding unit. Accordingly, when splitting of one coding tree unit is completed, transform, quantization, entropy encoding, etc. may be performed sequentially for each of the split coding units in a predetermined scan order.

According to one embodiment, the block splitting structure may include a geometric splitting tree structure in addition to the rectangle binary tree structure, rectangle ternary tree structure, and rectangle quad tree structure described above. According to the geometric splitting mode to which the geometric splitting tree structure is applied, one coding unit may be split into two or more regions according to a predetermined straight-line splitting boundary. For example, in the case of a triangle quad tree, a geometric binary tree, and an asymmetric ternary tree, it may be split into four, two, or three regions according to a predetermined straight-line splitting boundary. In addition, the two or more split regions may be independently predicted according to different coding information.

In the present invention, when splitting one coding tree unit, various geometric splitting tree structures are proposed in which a triangle or general rectangle coding unit, prediction unit, or transform unit is generated. The proposed geometric splitting tree structures include a geometric binary tree (GBT) structure using a triangle and a rectangle, an asymmetric ternary tree (ATT) structure, and a triangle quad tree (TQT) structure using a triangle.

In addition, a method of reordering residual signals to apply a transform to a unit determined according to a geometric splitting tree structure is proposed. In addition, a method of performing efficient transform/quantization on the reordered residual signals is proposed. Finally, a syntax structure of a bitstream for selecting the geometric splitting tree structure proposed in the present invention is proposed.

Hereinafter, the geometric splitting tree structure proposed in the present invention will be described.

According to FIG. 4, when the coding unit is split according to the rectangle binary tree structure, the rectangle ternary tree structure, and the rectangle quad tree structure, the square and/or rectangle coding unit is generated. However, according to the tree structure described in FIGS. 5 to 7, quadrangles and triangles, not squares and rectangles, may be generated as a result of splitting. Based on FIGS. 5 to 7, the geometric splitting tree structure proposed in the present invention will be described.

Figure 5:
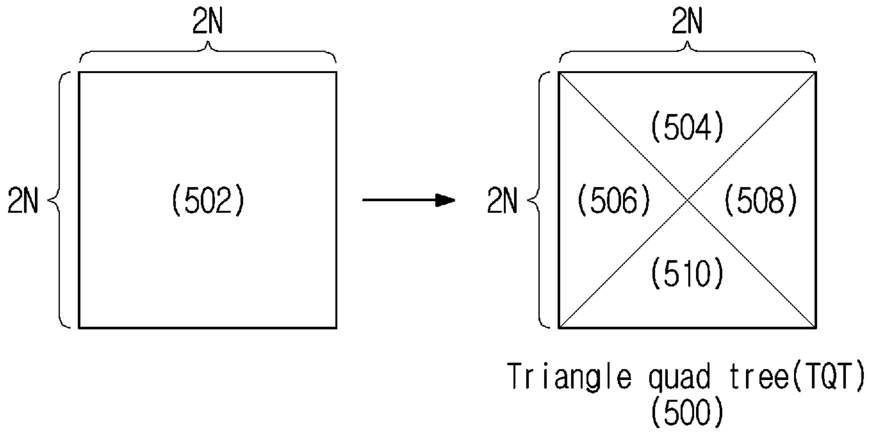
FIG. 5 shows a triangle quad tree (TQT) structure.

FIG. 5 shows a triangle quad tree (TQT) structure.

According to the rectangle quad tree structure 400 of FIG. 4, when the size of the upper block is 2N×2N, the upper block 402 is split into four square blocks 404, 406, 408 and 410 with a size of N×N. On the other hand, according to the triangle quad tree structure 500 of FIG. 5, the upper block 502 with a size of 2N×2N is split into four triangle blocks 504, 506, 508 and 510 with the same size. Here, the size of the base of each triangle is 2N, and the height based on the base is N.

The coding unit may be recursively split according to the rectangle quad tree structure 400 within a predetermined size range. However, splitting may no longer be performed on the triangle blocks split according to the triangle quad tree split structure 500. That is, when the upper block is split according to the triangle quad tree split structure 500, each split triangle coding unit becomes a leaf node and may no longer be split.

Figure 6:
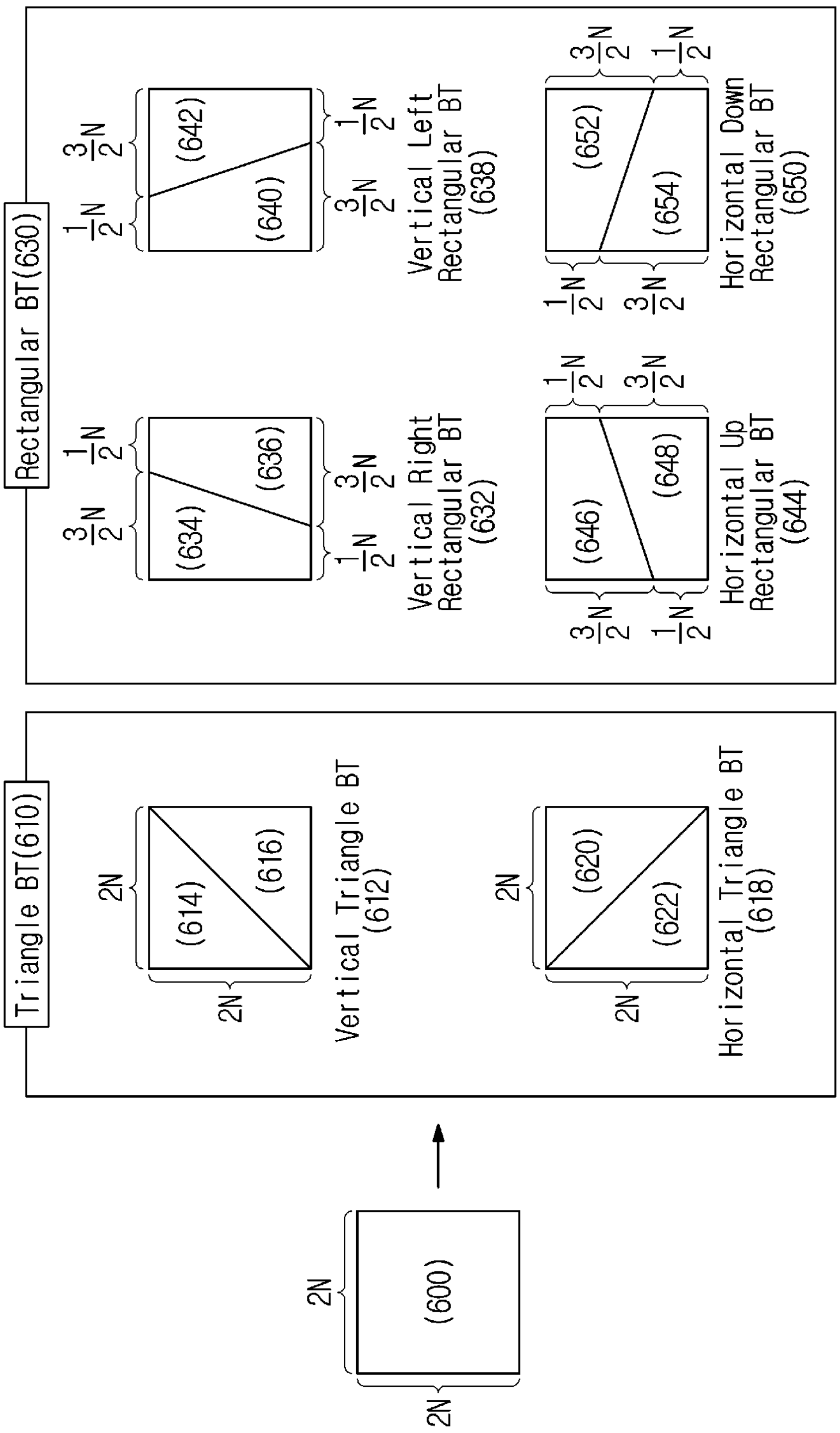
FIG. 6 shows a geometric binary tree (GBT).

FIG. 6 shows a geometric binary tree (GBT).

The geometric binary tree described in FIG. 6 is classified into a triangle binary tree (TBT) structure 610 and a quadrangle binary tree (QBT) structure 630. In addition, the triangle binary tree structure 610 is classified into a vertical triangle binary tree (VTBT) structure 612 and a horizontal triangle binary tree (HTBT) structure 618. In the triangle binary tree structure 610, each region divided by a split boundary has the same size.

According to the vertical triangle binary tree structure 612, the upper block 600 with a size of 2N×2N is split into two right-angled triangle blocks 614 and 616. The boundary of the right-angled triangle blocks 614 and 616 connects the lower left vertex and the upper right vertex of the upper block 600.

According to the horizontal triangle binary tree structure 618, the upper block 600 with a size of 2N×2N is split into two right-angled triangle blocks 620 and 622. The boundary of the right-angled triangle blocks 620 and 622 connects the upper left vertex and the lower right vertex of the upper block 600.

The quadrangle binary tree structure 630 may be classified into a vertical right quadrangle BT (VRQBT) structure 632, a vertical left quadrangle BT (VLQBT) structure 638, a horizontal up quadrangle BT (HUQBT) structure 644, and a horizontal down quadrangle BT (HDQBT) structure 650. In the quadrangle binary tree structure 630, each region divided by a split boundary has the same size.

According to the vertical right quadrangle binary tree structure 632, the upper block 600 with a size of 2N×2N is split into two rectangle blocks 634 and 636. The boundary of the rectangle blocks 634 and 636 connects a point 1/2N away from the left side of the lower line of the upper block 600 and a point 3/2N away from the left side of the upper line.

According to the vertical left quadrangle binary tree structure 638, the upper block 600 with a size of 2N×2N is split into two rectangle blocks 640 and 642. The boundary of the rectangle blocks 640 and 642 connects a point 3/2N away from the left side of the lower line of the upper block 600 and a point 1/2N away from the left side of the upper line.

According to the horizontal upper quadrangle binary tree structure 644, the upper block 600 with a size of 2N×2N is split into two rectangle blocks 646 and 648. The boundary of the rectangle blocks 646 and 648 connects a point 3/2N away from the upper side of the left line of the upper block 600 and a point 1/2N away from the upper side of the right line.

According to the horizontal down quadrangle binary tree structure 650, the upper block 600 with a size of 2N×2N is split into two rectangle blocks 652 and 654. The boundary of the rectangle blocks 652 and 654 connects a point 1/2N away from the upper side of the left line of the upper block 600 and a point 3/2N away from the upper side of the right line.

In some embodiments, the positions of the points where the boundaries of the four quadrangle binary tree structures described above connect may be determined differently.

Although only four quadrangle binary tree structures are illustrated in FIG. 6, quadrangle binary tree structures having other shapes may be used to split the block. In FIG. 6, only an embodiment in which the two endpoints of the split boundary of the upper block 600 are at the upper line and the lower line or at the right line and the left line is described. However, in some embodiments, the two endpoints of the split boundary may be determined to be at the upper line and the right line, at the upper line and the left line, at the lower line and the right line, or at the lower line and the left line.

In addition, in order to determine the split boundary, the positions of the two endpoints of the boundary may be determined respectively. For example, in the case of a vertical quadrangle binary tree structure, the positions of the endpoints of the split boundary of the upper line of the upper block 600 and the positions of the endpoints of the split boundary of the lower line of the upper block 600 may be determined. At this time, the x components of the two positions may be determined to be unequal. In addition, in the case of a horizontal quadrangle binary tree structure, the positions of the endpoints of the split boundary of the left line of the upper block 600 and the positions of the endpoints of the split boundary of the right line of the upper block 600 may be determined. At this time, the y components of the two positions may be determined to be unequal. At this time, even if the two endpoints of the split boundary are at the upper line and the right line, at the upper line and the left line, at the lower line and the right line, or at the lower line and the left line, the positions of the two endpoints of the boundary may be determined respectively. At this time, the position of the endpoint may be determined in units such as ¼, ⅛, 1/16, etc.

Alternatively, in order to determine the split boundary of the upper block 600, the angle and position of the split boundary may be determined respectively. Then, the split direction is determined according to the angle of the split boundary, and according to the position of the split boundary, a specific point through which the split boundary passes from a specific point of the upper block 600 may be determined. The split direction may be selected from predetermined direction candidates configured in a diagonal direction. The vertical direction and the horizontal direction may be excluded from the predetermined direction candidates. The position of the split boundary may be determined based on the center point of the upper block 600. For example, when the coordinate of the center point of the upper block 600 is (N, N), the position of the split boundary may be determined by adding an offset to the x component or the y component of the center point.

According to the rectangle binary tree structure 430 of FIG. 4, the coding unit is split into two rectangle blocks with the same size. On the other hand, according to the geometric binary tree structure, the coding unit is split into two triangle blocks or rectangle blocks with the same size.

In addition, the lower coding unit generated by splitting according to the rectangle binary tree structure 430 of FIG. 4 may be split according to the rectangle binary tree structure or the rectangle ternary tree structure if a predetermined size condition and/or a predetermined depth condition is satisfied. However, the lower coding unit generated by splitting according to the rectangle binary tree structure may be set so that it may no longer be split according to the rectangle quad tree structure.

Splitting according to the rectangle quad tree structure as well as the rectangle binary tree structure and the rectangle ternary tree structure may not be applied to the sub block generated according to the geometric binary tree structure. That is, if the upper block is split according to the geometric binary tree, the sub blocks generated by splitting may no longer be split.

Figure 7:
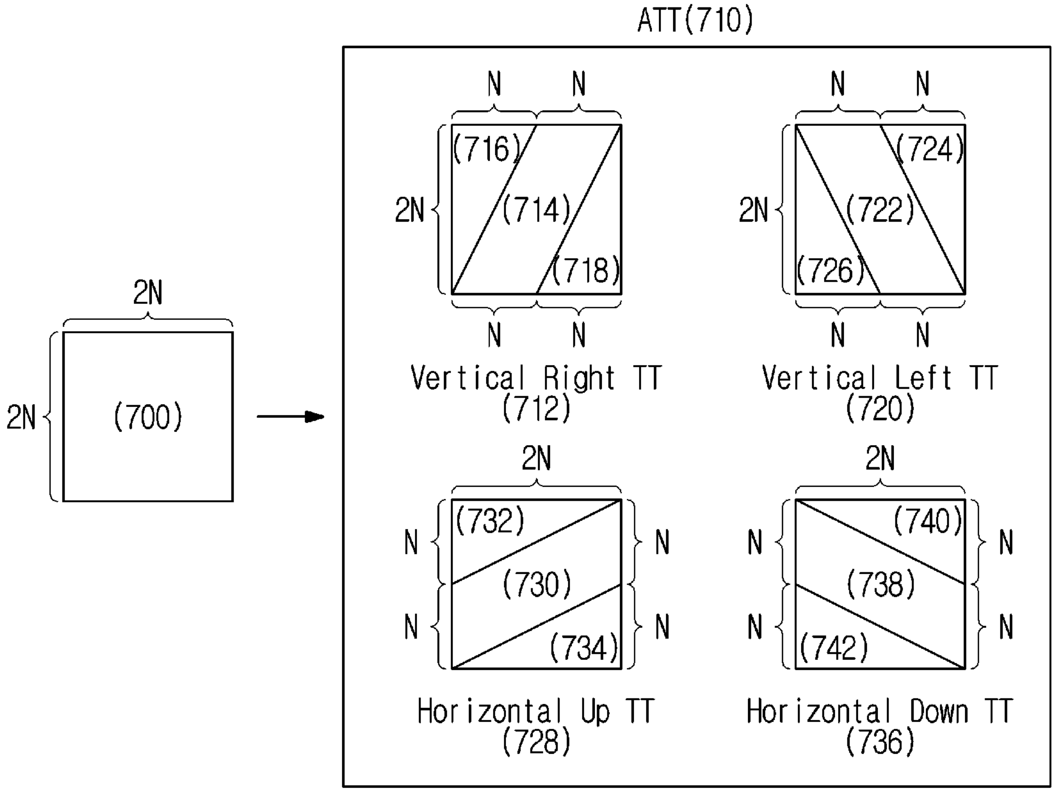
FIG. 7 shows an asymmetric ternary tree (ATT) structure according to asymmetric splitting.

FIG. 7 shows an asymmetric ternary tree (ATT) structure according to asymmetric splitting.

According to FIG. 7, the asymmetric ternary tree structure 710 may include a vertical right ternary tree (VRTT) structure 712, a vertical left ternary tree (VLTT) structure 720, a horizontal up ternary tree (HUTT) structure 728, and a horizontal down ternary tree (HDTT) structure 736. According to the asymmetric ternary tree structure 710, a block is split into a rectangle block with an area of N×2N and two triangle blocks with an area of (N×2N)/2.

According to the vertical right ternary tree structure 712, the upper block 700 with a size of 2N×2N is split into a rectangle block 714 with an area of N×2N and two triangle blocks 716 and 718 with an area of (N×2N)/2. The boundary splitting the rectangle block 714 and the left triangle block 716 connects the lower left vertex of the upper block 700 and the center point of the top line. The boundary splitting the rectangle block 714 and the right triangle block 718 connects the upper right vertex of the upper block 700 and the center point of the bottom line.

According to the vertical left ternary tree structure 720, the upper block 700 with a size of 2N×2N is split into a rectangle block 722 with an area of N×2N and two triangle blocks 724 and 726 with an area of (N×2N)/2. The boundary splitting the rectangle block 722 and the right triangle block 724 connects the lower right vertex of the upper block 700 and the center point of the top line. The boundary splitting the rectangle block 722 and the left triangle block 726 connects the upper left vertex of the upper block 700 and the center point of the bottom line.

According to the horizontal up ternary tree structure 728, the upper block 700 with a size of 2N×2N is split into a rectangle block 730 with an area of 2N×N and two triangle blocks 732 and 734 with an area of (N×2N)/2. The boundary splitting the rectangle block 730 and the upper triangle block 732 connects the upper right vertex of the upper block 700 and the center point of the left line. The boundary splitting the rectangle block 730 and the lower triangle block 734 connects the lower left vertex of the upper block 700 and the center point of the right line.

According to the horizontal down ternary tree structure 736, the upper block 700 with a size of 2N×2N is split into a rectangle block 738 with an area of 2N×N and two triangle blocks 740 and 742 with an area of (N×2N)/2. The boundary splitting the rectangle block 738 and the upper triangle block 740 connects the upper left vertex of the upper block 700 and the center point of the right line. The boundary splitting the rectangle block 738 and the lower triangle block 742 connects the lower right vertex of the upper block 700 and the center point of the left line.

In some embodiments, the positions of the points where the boundaries of the four asymmetric ternary trees described above connect may be determined differently.

Although only four asymmetric ternary tree structures are illustrated in FIG. 7, asymmetric ternary tree structures having other shapes may be used to split the block. At this time, in order to determine the split boundary, the positions of the endpoints located at the boundary line of the block among the two endpoints of the boundary may be determined respectively. At this time, the positions of the endpoints located at the vertices of the block among the two endpoints of the boundary may be fixed.

For example, in the case of a vertical right ternary tree structure, in order to determine the left split boundary, the position of the endpoint of the left split boundary of the upper line of the upper block 700 may be determined, and in order to determine the right split boundary, the position of the endpoint of the right split boundary of the lower line of the upper block 700 may be determined. In addition, in the case of a vertical left ternary tree structure, in order to determine the left split boundary, the position of the endpoint of the left split boundary of the lower line of the upper block 700 may be determined, and in order to determine the right split boundary, the position of the endpoint of the right split boundary of the upper line of the upper block 700 may be determined. In addition, in the case of a horizontal up ternary tree structure, in order to determine the upper split boundary, the position of the endpoint of the upper split boundary of the left line of the upper block 700 may be determined, and in order to determine the lower split boundary, the position of the endpoint of the lower split boundary of the right line of the upper block 700 may be determined. In addition, in the case of a horizontal down ternary tree structure, in order to determine the upper split boundary, the position of the endpoint of the upper split boundary of the right line of the upper block 700 may be determined, and in order to determine the lower split boundary, the position of the endpoint of the lower split boundary of the left line of the upper block 700 may be determined. At this time, the position of the endpoint may be determined in units such as ¼, ⅛, and 1/16.

According to the rectangle ternary tree structure according to an embodiment, a block is split into three rectangle blocks. In addition, the sub block generated by splitting according to the rectangle ternary tree structure may be split according to the rectangle binary tree structure or the rectangle ternary tree structure if a splitable size condition and a depth condition is satisfied. However, the encoding and decoding apparatus may be set so that splitting according to the rectangle quad tree structure is not applied to the sub blocks.

On the other hand, according to the asymmetric ternary tree structure, the block is split into two triangle blocks with the same size and one rectangle block. In addition, the encoding and decoding apparatus may be set so that splitting according to the rectangle binary tree structure, the rectangle ternary tree structure, and the rectangle quad tree structure is not applied to the sub blocks generated by splitting according to the asymmetric ternary tree structure.

According to one embodiment, transform may be performed based on the coding unit block, the splitting of which is completed. Accordingly, the coding unit block may be a basic unit for performing the transform. Accordingly, the transform (inverse transform), quantization (inverse quantization), and entropy encoding (entropy decoding) may be sequentially performed on each coding unit block split according to a binary tree, ternary tree, or rectangle quad tree structure. At this time, the transform (inverse transform) and quantization (inverse quantization) may be applied only to a block having a square or rectangular shape.

According to the geometric splitting tree structure described in FIGS. 5 to 7, a triangle block and/or a rectangle block is generated. The rectangle block generated according to the geometric splitting tree structure has a shape of a parallelogram or a trapezoid, not a square or a rectangle. That is, since the block split according to the geometric splitting tree structure is not a square or a rectangle, it is difficult to apply a transform method for a square or rectangle block to the block generated according to the geometric splitting tree structure. Therefore, in order to apply transform quantization to the block generated according to the geometric splitting tree structure, it is necessary to vectorize residual signals into a form to which the transform may be applied, by reordering the residual signals of the block.

Figure 8:
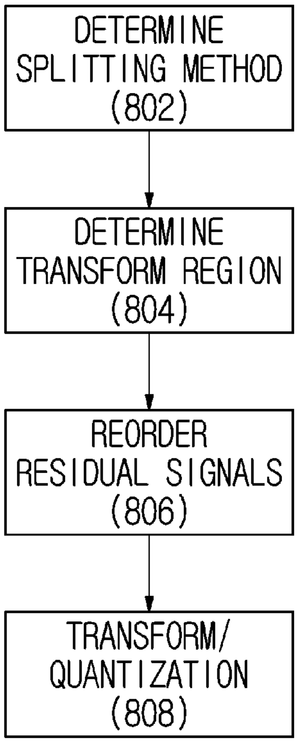
FIG. 8 shows the order of reordering residual signals to apply transform and quantization to each region split according to a geometric splitting tree structure.

FIG. 8 shows the order of reordering residual signals to apply transform and quantization to each region split according to a geometric splitting tree structure.

In step 802, the split structure of the block and block splitting are performed. The split structure of the block may be determined to be one of the geometric tree structures described above, as well as a rectangle binary tree, rectangle ternary tree, or rectangle quad tree structure.

In step 804, if block splitting is performed based on one of the geometric tree structures, a transform region for a block requiring transform is determined.

In step 806, residual signal reordering is performed on the blocks of the transform region. According to the residual signal reordering, the residual signals are vectorized. In addition, a transform block including the vectorized residual signals is generated.

In addition, in step 808, the transform and quantization are performed on the transform block to which the residual signal reordering is applied.

If the split structure of the block is not a geometric tree structure but is a binary tree, ternary tree, or rectangle quad tree structure, steps 804 and 806 are not performed, and transform and quantization may be performed on each block.

It was described based on the encoding process of FIG. 8. In the decoding process, inverse quantization and inverse transform are performed on the transform coefficients of the transform block, thereby generating residual signals, and the residual signals of the transform block are reordered inversely in the transform region. In addition, the residual blocks of the upper block or sub block may be determined based on the residual signals of the transform region.

Figure 9:
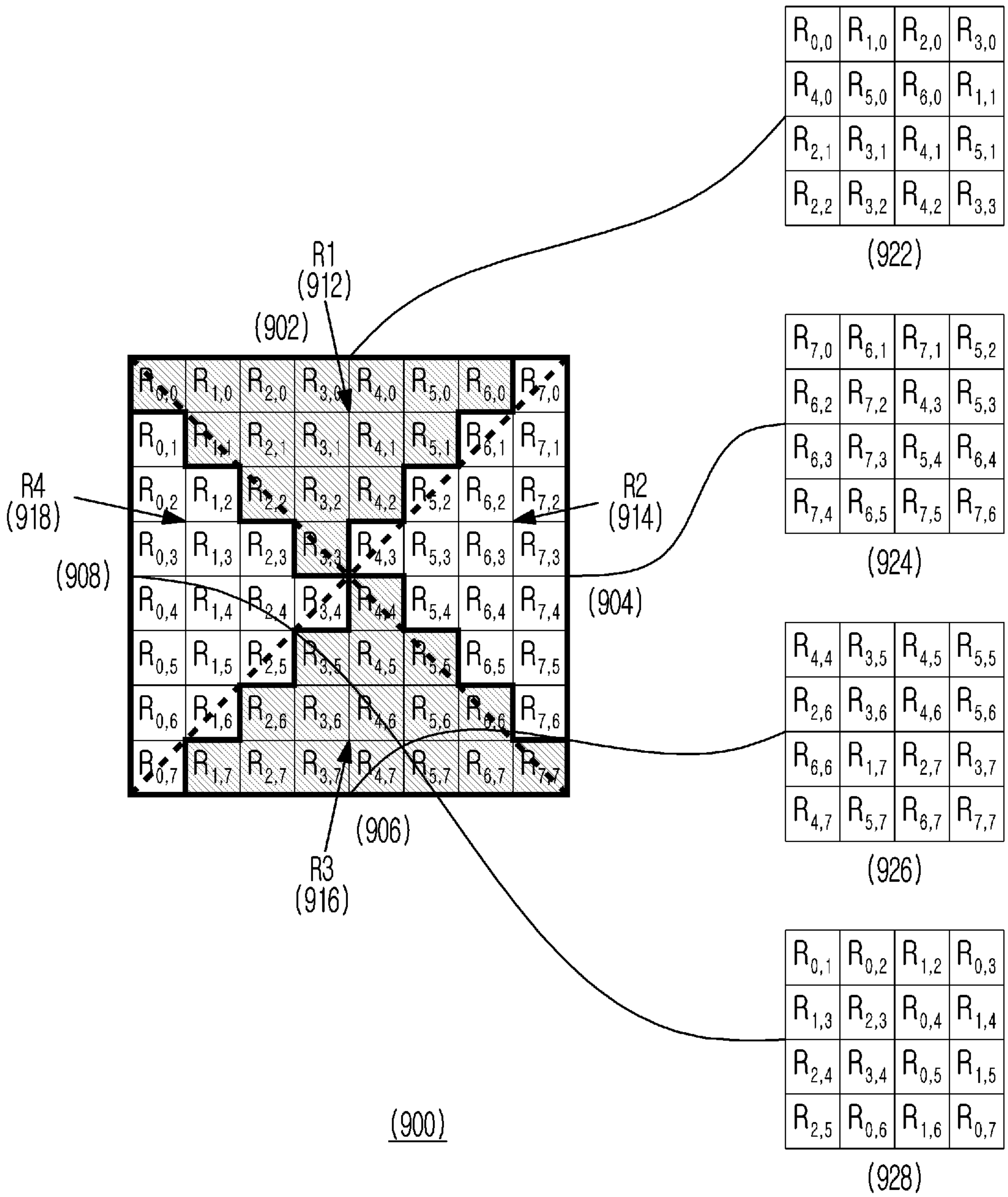
FIG. 9 illustrates an embodiment of a method of reordering residual signals in a triangle quad tree structure.

FIG. 9 illustrates an embodiment of a method of reordering residual signals in a triangle quad tree structure.

In FIG. 9, an upper block 900 is split into four triangle blocks 902, 904, 906 and 908. In addition, split regions R1 to R4 912, 914, 916 and 918 corresponding to each triangle block are determined. Each split region may include residual signals inside the split boundary.

It is necessary to determine which of two adjacent triangle blocks the residual signal located at the split boundary will be included in. In FIG. 9, the residual signal located at the split boundary is included in the transform region corresponding to the triangle block in the clockwise direction. In some embodiments, unlike FIG. 9, the residual signal located at the split boundary may be included in the triangle block in the counterclockwise direction.

Accordingly, transform regions R1 to R4 912, 914, 916 and 918 corresponding to four triangle blocks 902, 904, 906 and 908 are determined. For example, residual signals $R_{1,0}$, $R_{2,0}$, $R_{3,0}$, $R_{4,0}$, $R_{5,0}$, $R_{6,0}$, $R_{2,1}$, $R_{3,1}$, $R_{4,1}$, $R_{5,1}$, $R_{3,2}$, and $R_{4,2}$ included in triangle block 902, as well as residual signals $R_{0,0}$, $R_{1,1}$, $R_{2,2}$, and $R_{3,3}$ at the boundary of two triangle blocks 902 and 908 are included in transform region R1 912. If, unlike in FIG. 9, the residual signals located at the split boundary is included in a triangle block in the counterclockwise direction, the residual signals $R_{7,0}$, $R_{6,1}$, $R_{5,2}$, and $R_{4,3}$ at the boundary of two triangle blocks 902 and 904 may be included in the transform region R1 912.

Since the transform region is not square or rectangular, transform cannot be applied. Therefore, the residual signals of each transform region need to be reordered in a rectangular or square shape. For example, the residual signals of transform region R1 912 are reordered in the square transform block 922.

At this time, the residual signals of the transform region R1 912 are scanned in a horizontal zigzag scan order. In addition, the scanned residual signals are ordered in a horizontal zigzag scan order in the square transform block 922 in the scanned order. As a specific example, the residual signals of the transform region R1 912 may be scanned in the horizontal zigzag scan order in the order of $R_{0,0}$, $R_{1,0}$, $R_{2,0}$, $R_{3,0}$, $R_{4,0}$, $R_{5,0}$, $R_{6,0}$, $R_{1,1}$, $R_{2,1}$, $R_{3,1}$, $R_1$, $R_{5,1}$, $R_{2,2}$, $R_{3,2}$, $R_{4,2}$, $R_{3,3}$. In addition, the scanned residual signals are sequentially ordered in a horizontal zigzag scan order in the square transform block 922.

In FIG. 9, the residual signal scan of the transform region is performed in a horizontal zigzag scan order, but this is only an example. Therefore, the residual signal scan of the transform region may be performed based on an arbitrary scan order (vertical zigzag scan, diagonal zigzag scan, right or left horizontal scan, down or up vertical scan, arbitrary scan, etc.).

In addition, in FIG. 9, the residual signals scanned in the transform region are ordered in a square transform block in a horizontal zigzag scan order, but the ordering of the residual signals may be performed based on an arbitrary scan order (vertical zigzag scan, diagonal zigzag scan, right or left horizontal scan, down or up vertical scan, arbitrary scan, etc.).

According to FIG. 9, each transform region contains 16 residual signals. The residual signal reordering according to FIG. 9 may also be applied to a block larger than the upper block 900 with a size of 8×8. For example, the residual signal reordering according to FIG. 9 may also be applied to upper blocks with sizes of 16×16, 32×32, and 64×64.

According to FIG. 9, the scanned residual signals are ordered in transform blocks 922, 924, 926, and 928 with a size of 4×4, but may be ordered in transform blocks with a size of 2×8 or 8×2 in some embodiments. That is, the transform blocks in which the residual signals are ordered may have a rectangular shape rather than a square shape.

Hereinafter, FIGS. 10 to 16 illustrate embodiments of a method of reordering residual signals in a geometric binary tree structure.

Figure 10:
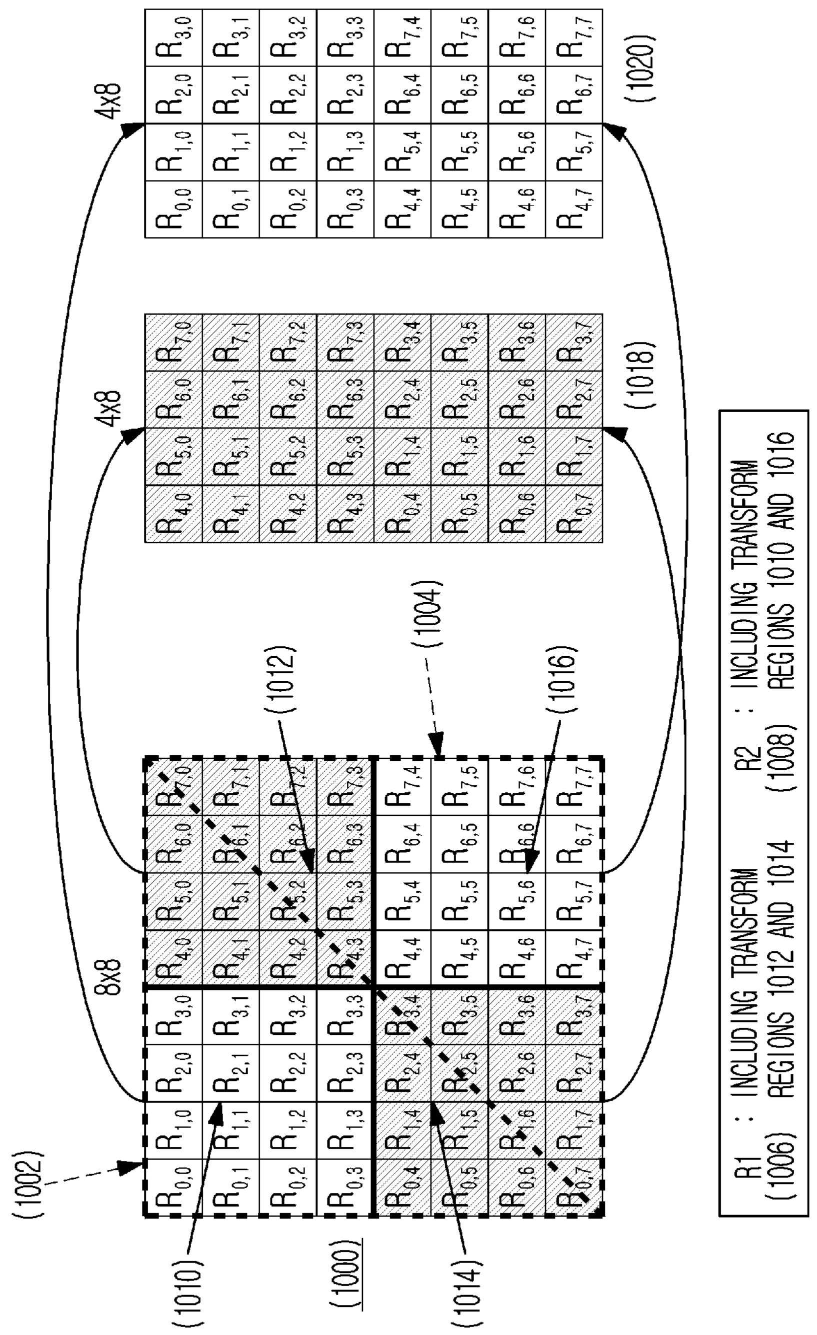
FIG. 10 illustrates an embodiment of a method of reordering residual signals in two transform blocks in a vertical triangle binary tree structure.
Figure 12:
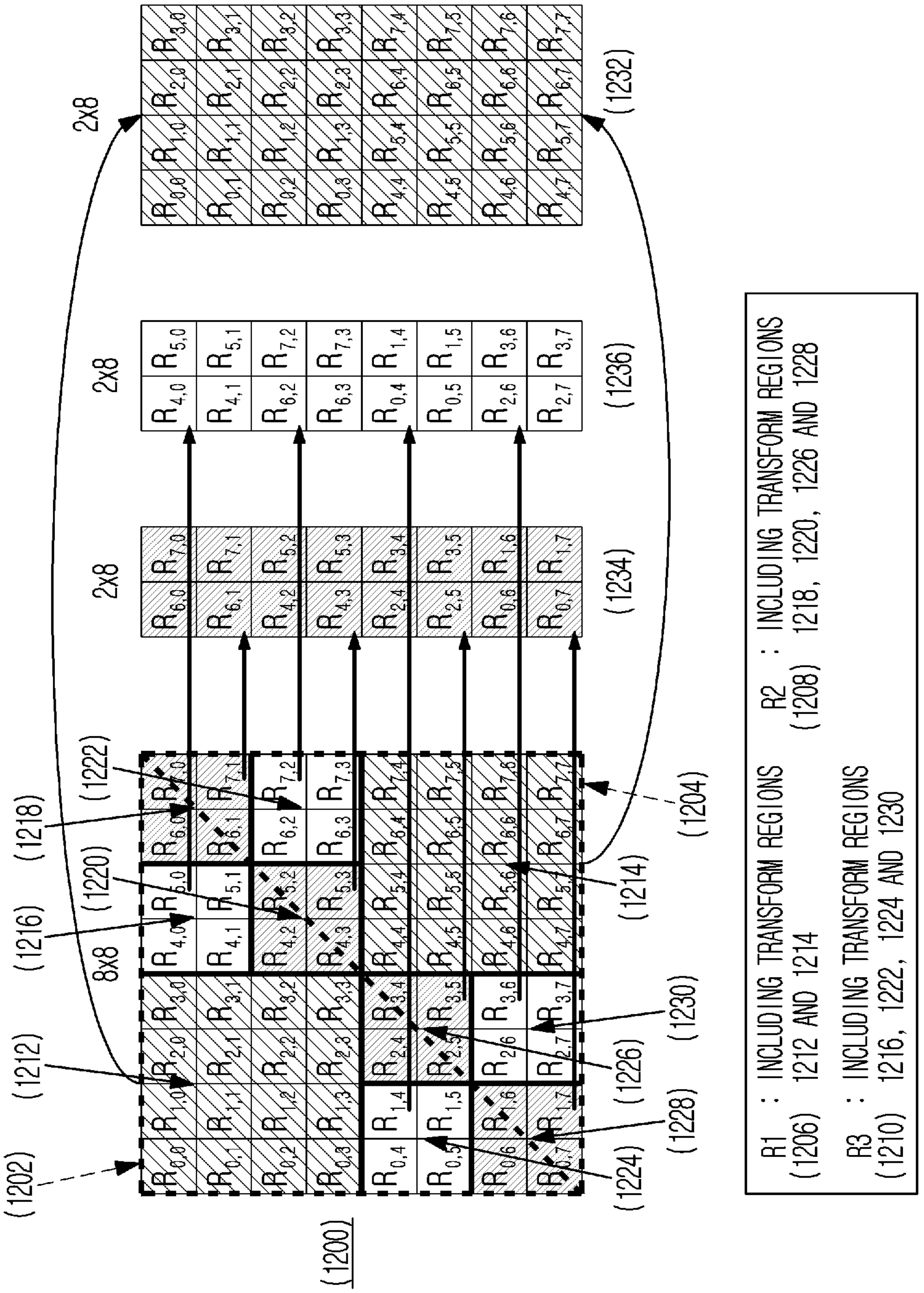
FIG. 12 illustrates an embodiment of a method of reordering residual signals in three transform blocks in a vertical triangle binary tree structure.

FIGS. 10 and 12 illustrate embodiments of a method of rearranging residual signals in a vertical triangle binary tree structure.

FIG. 10 illustrates an embodiment of a method of reordering residual signals in two transform blocks in a vertical triangle binary tree structure.

According to FIG. 10, an upper block 1000 is split into two triangle blocks 1002 and 1004. In addition, in order to reorder the residual signals included in the triangle blocks 1002 and 1004, transform regions R1 and R2 1006 and 1008 are determined. According to FIG. 10, regardless of the split direction, the upper block 1000 with a size of 8×8 is split into four equal parts to determine a block with a size of 4×4, and transform regions 1006 and 1008 may be determined by combining the four blocks with a size of 4×4. For example, transform region R1 1006 may include an upper right block 1012 and a lower left block 1014, and transform region R2 1008 may include an upper left block 1010 and a lower right block 1016.

Based on transform regions R1 and R2 1006 and 1008, transform blocks 1018 and 1020 may be determined. The transform block 1018 with a size of 4×8 may be generated by combining the upper right block and the lower left block of transform region R1 1006. In addition, the transform block 1020 with a size of 4×8 may be generated by combining the upper left block and the lower right block of transform region R2 1008. Although, in FIG. 10, the transform block with the size of 4×8 is illustrated as being generated, a transform block with a size of 8×4 may be generated in some embodiments.

In FIG. 10, two transform blocks with a size of 4×8 are generated from four blocks with a size of 4×4, which are split from the upper block 1000. However, according to another embodiment, the four blocks with the size of 4×4 may be determined to be four transform blocks with a size of 4×4 without residual signal reordering.

Figure 11:
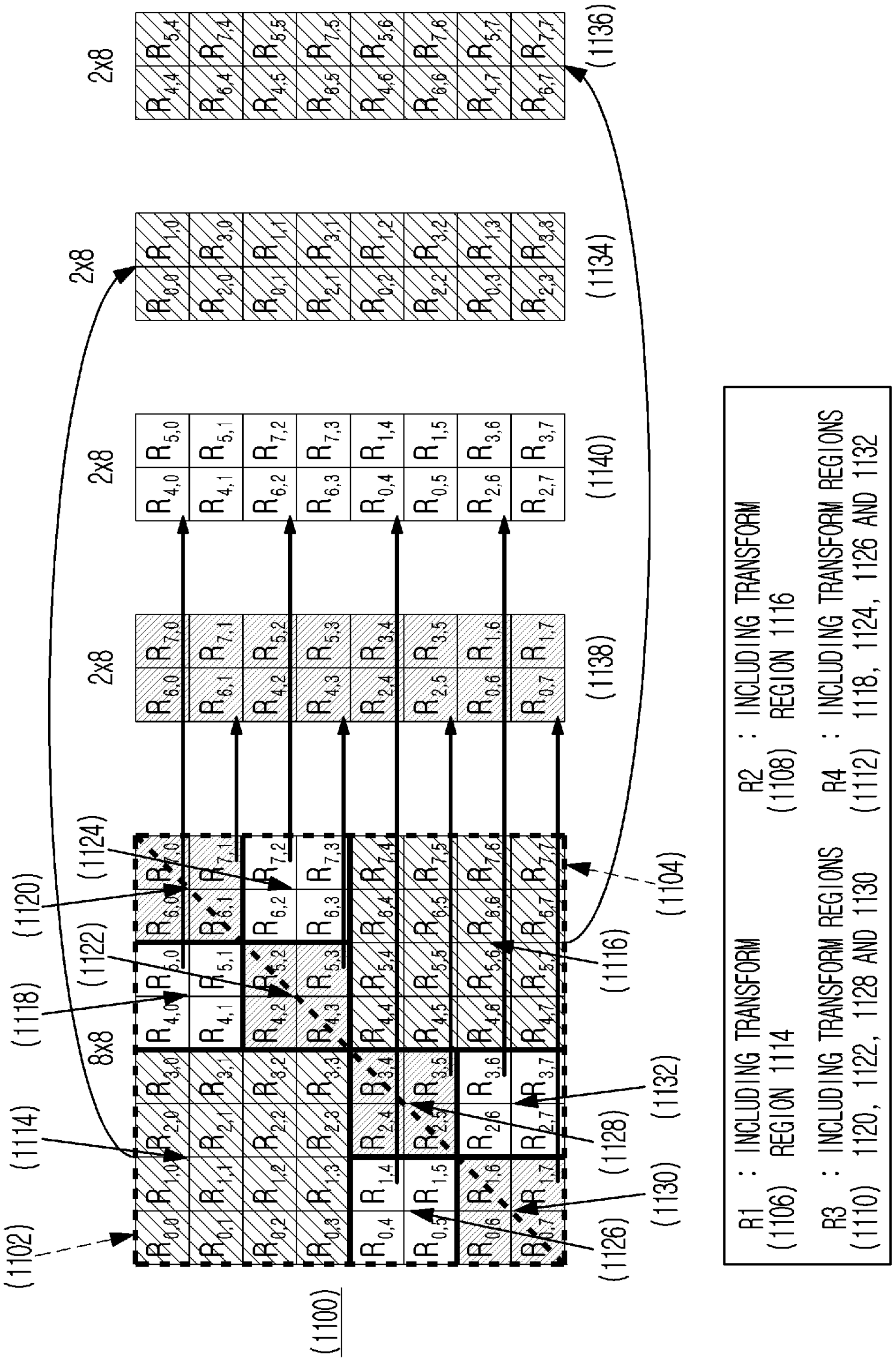
FIG. 11 illustrates an embodiment of a method of reordering residual signals in four transform blocks in a vertical triangle binary tree structure.

FIG. 11 illustrates an embodiment of a method of reordering residual signals in four transform blocks in a vertical triangle binary tree structure.

According to FIG. 11, an upper block 1100 is split into two triangle blocks 1102 and 1104. In addition, in order to reorder the residual signals included in the triangle blocks 1102 and 1104, transform regions R1, R2, R3, and R4 1106, 1108, 1110 and 1112 are determined. To determine the transform region, the upper block 1100 may be split into two 4×4 blocks 1114 and 1116 and eight 2×2 blocks 1118, 1120, 1122, 1124, 1126, 1128, 1130 and 1132, as illustrated in FIG. 11.

According to FIG. 11, transform region R1 1106 may be composed of a 4×4 block 1114. In addition, transform region R2 1108 may be composed of a 4×4 block 1116. Transform region R3 1110 may be composed of four 2×2 blocks 1120, 1122, 1128 and 1130. Transform region R4 1112 may be composed of four 2×2 blocks 1118, 1124, 1126 and 1132.

Based on transform regions R1, R2, R3 and R4 1106, 1108, 1110 and 1112, transform blocks 1134, 1136, 1138 and 1140 may be determined. The residual signals of transform region R1 1106 may be scanned in the horizontal zigzag scan order, and the scanned residual signal may be ordered in the transform block 1134 with a size of 2×8 in the horizontal zigzag scan order. In addition, the residual signals of transform region R2 1108, May be scanned in the horizontal zigzag scan order, and the scanned residual signal may be ordered in the transform block 1136 with a size of 2×8 in the horizontal zigzag scan order.

The transform block 1138 with a size of 2×8 may be generated by combining four 2×2 blocks 1120, 1122, 1128 and 1130 of transform region R3 1110. The transform block 1140 with a size of 2×8 may be generated by combining four 2×2 blocks 1118, 1124, 1126 and 1132 of transform region R4 1112. Although the transform block with a size of 2×8 is illustrated as being generated in FIG. 11, a transform block with a size of 4×4 or 8×2 may be generated in some embodiments.

In FIG. 11, the residual signals of transform regions R1 and R2 1106 and 1108 are reordered in the transform block with a size of 2×8. However, in some embodiments, transform regions R1 and R2 1106 and 1108 may be determined to be a transform block with a size of 4×4 without residual signal reordering.

FIG. 12 illustrates an embodiment of a method of reordering residual signals in three transform blocks in a vertical triangle binary tree structure.

According to FIG. 12, an upper block 1200 is split into two triangle blocks 1202 and 1204. In addition, in order to reorder the residual signals included in the triangle blocks 1202 and 1204, transform regions R1, R2, and R3 1206, 1208 and 1210 are determined. To determine the transform region, the upper block 1200 may be split into two 4×4 blocks 1212 and 1214 and eight 2×2 blocks 1216, 1218, 1220, 1222, 1224, 1226, 1228 and 1230, as illustrated in FIG. 12.

According to FIG. 12, transform region R1 1206 may be composed of two 4×4 blocks 1212 and 1214. Transform region R2 1208 may be composed of four 2×2 blocks 1218, 1220, 1226 and 1228. Transform region R3 1210 may be composed of four 2×2 blocks 1216, 1222, 1224 and 1230.

Based on transform regions R1, R2 and R3 1206, 1208 and 1210, transform blocks 1232, 1234 and 1236 may be determined. The residual signals of transform region R1 1206 are scanned sequentially from the upper 4×4 block 1212 in the horizontal zigzag scan order, and the scanned residual signal may be ordered in a transform block 1232 in the horizontal zigzag scan order. Although, in FIG. 12, a transform block with a size of 4×8 is illustrated as being generated, a transform block with a size of 8×4 may also be generated in some embodiments.

A transform block 1234 with a size of 2×8 may be generated by combining four 2×2 blocks 1218, 1220, 1226 and 1228 of transform region R2 1208. A transform block 1236 with a size of 2×8 may be generated by combining four 2×2 blocks 1216, 1222, 1224 and 1230 of transform region R3 1 1210. Although the transform block with a size of 2×8 is illustrated as being generated in FIG. 12, a transform block with a size of 4×4 or 8×2 may be generated in some embodiments.

In FIGS. 10 to 12, the residual signal scan of the transform region is performed in the horizontal zigzag scan order, but may be performed in another arbitrary scan order (vertical zigzag scan, diagonal zigzag scan, right or left horizontal scan, down or up vertical scan, arbitrary scan, etc.).

In FIGS. 10 to 12, the residual signals scanned in the transform region are ordered in the transform block in the horizontal zigzag scan order, but may be ordered in the transform block based on another arbitrary scan order (vertical zigzag scan, diagonal zigzag scan, right or left horizontal scan, down or up vertical scan, arbitrary scan, etc.). The scan order applied to the residual signal ordering may be different from the scan order used for the residual signal scan of the transform region.

Although the residual signal reordering is described based on the block with the size of 8×8 in FIGS. 10 to 12, the transform region and the transform block may be determined by the method of FIGS. 10 to 12 for larger blocks such as 16×16, 32×32, and 64×64.

In FIGS. 10 to 12, it was described based on a vertical triangle binary tree structure. However, the residual signal reordering of FIGS. 10 to 12 may also be applied to a horizontal triangle binary tree structure. However, since the split directions of the vertical triangle binary tree structure and the horizontal triangle binary tree structure are different, the embodiments of FIGS. 10 to 12 may be applied with the left and right inversions.

FIGS. 13 to 16 illustrate an embodiment of a method of reordering residual signals in a quadrangle binary tree structure.

Figure 13:
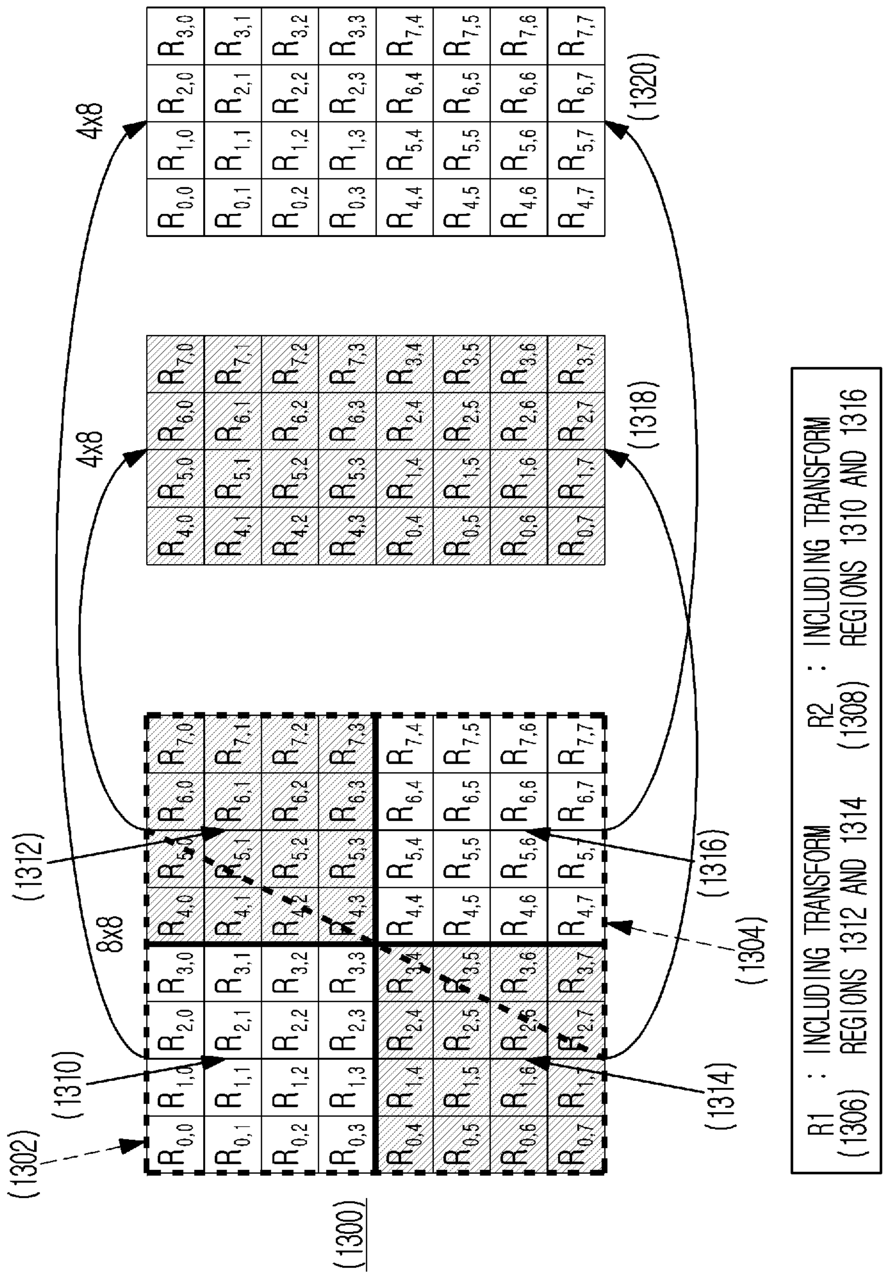
FIG. 13 illustrates an embodiment of a method of reordering residual signals in two transform blocks in a vertical right quadrangle binary tree structure.

FIG. 13 illustrates an embodiment of a method of reordering residual signals in two transform blocks in a vertical right quadrangle binary tree structure.

According to FIG. 13, an upper block 1300 is split into two rectangle blocks 1302 and 1304. In addition, in order to reorder the residual signals included in the rectangle blocks 1302 and 1304, transform regions R1 and R2 1306 and 1308 are determined. According to FIG. 13, regardless of the split direction, the upper block 1300 with a size of 8×8 is split into four parts to determine a block with a size of 4×4, and the transform regions 1306 and 1308 may be determined by combining the four blocks with a size of 4×4. For example, transform region R1 1306 may include an upper right block and a lower left block, and transform region R2 1308 may include an upper left block and a lower right block.

Based on transform regions R1 and R2 1306 and 1308, transform blocks 1318 and 1320 may be determined. A transform block 1318 with a size of 4×8 may be generated by combining the upper right block 1312 and the lower left block 1314 of transform region R1 1306. In addition, a transform block 1320 with a size of 4×8 may be generated by combining the upper left block 1310 and the lower right block 1316 of transform region R2 1308. Although the transform block with the size of 4×8 is illustrated as being generated in FIG. 13, a transform block with a size of 8×4 may be generated in some embodiments.

In FIG. 13, two transform blocks with a size of 8×4 are generated from four blocks with a size of 4×4 split from the upper block 1300. However, according to another embodiment, the four blocks with the size of 4×4 may be determined to be four transform blocks with the size of 4×4 without residual signal reordering.

Figure 14:
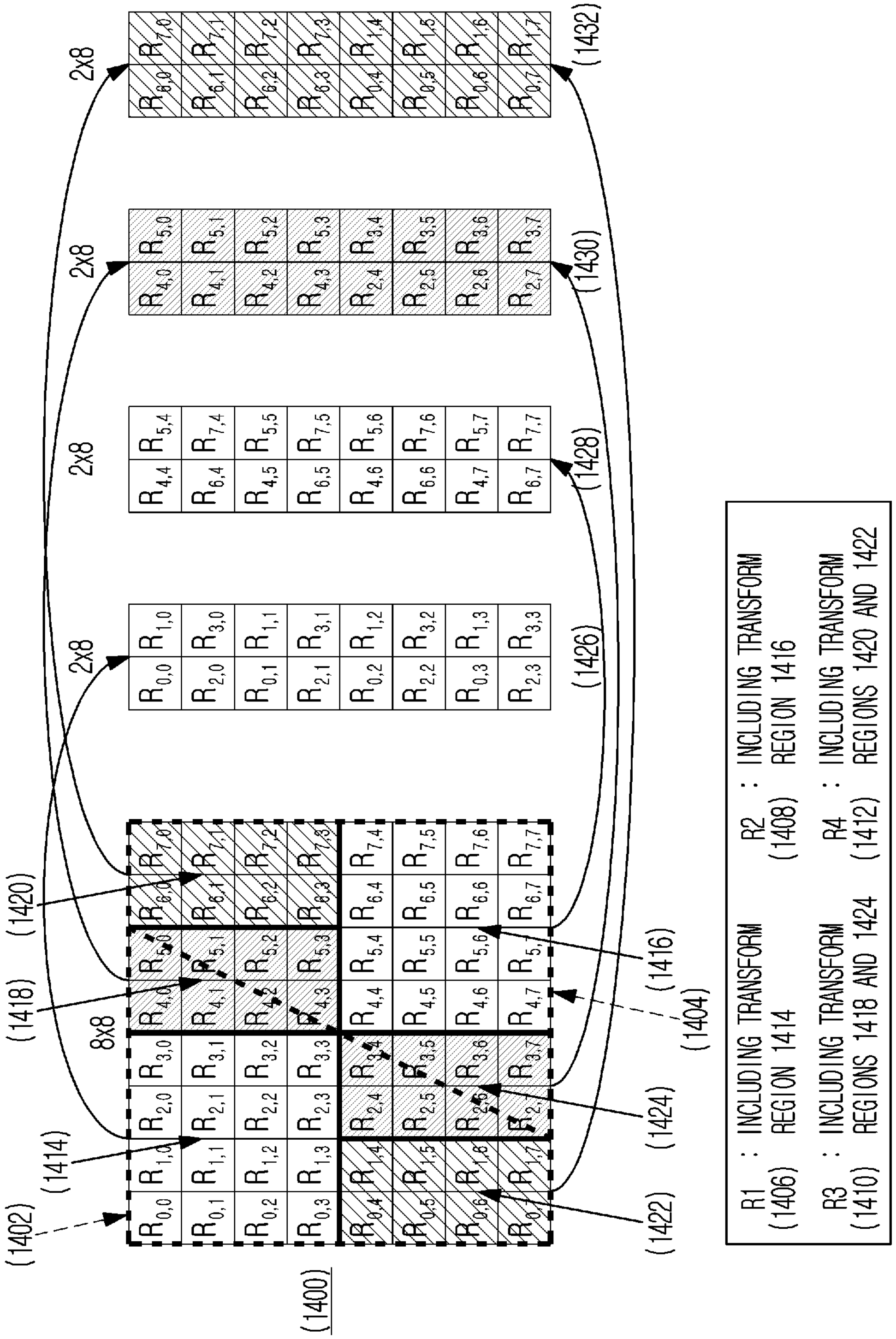
FIG. 14 illustrates an embodiment of a method of reordering residual signals in four transform blocks in a vertical right quadrangle binary tree structure.

FIG. 14 illustrates an embodiment of a method of reordering residual signals in four transform blocks in a vertical right quadrangle binary tree structure.

According to FIG. 14, an upper block 1400 is split into two rectangle blocks 1402 and 1404. In addition, in order to reorder the residual signals included in the rectangle blocks 1402 and 1404, transform regions R1, R2, R3, and R4 1406, 1408, 1410 and 1412 are determined. To determine the transform regions, the upper block 1400 may be split into two 4×4 blocks 1414 and 1416 and four 2×4 blocks 1418, 1420, 1422 and 1424, as illustrated in FIG. 14.

According to FIG. 14, transform region R1 1406 may be composed of a 4×4 block 1414. In addition, transform region R2 1408 may be composed of a 4×4 block 1416. Transform region R3 1410 may be composed of two 2×4 blocks 1418 and 1424. Transform region R4 1412 may be composed of two 2×4 blocks 1420 and 1422.

Based on transform regions R1, R2, R3 and R4 1406, 1408, 1410 and 1412, transform blocks 1426, 1428, 1430 and 1432 may be determined. The residual signals of transform region R1 1406 may be scanned in the horizontal zigzag scan order, and the scanned residual signal may be ordered in a transform block 1426 with a size of 2×8 in the horizontal zigzag scan order. In addition, the residual signals of transform region R2 1408 may be scanned in the horizontal zigzag scan order, and the scanned residual signal may be ordered in a transform block 1428 with a size of 2×8 in the horizontal zigzag scan order.

A transform block 1430 with a size of 2×8 may be generated by combining two 2×4 blocks 1418 and 1424 of transform region R3 1410. A transform block 1432 with a size of 2×8 may be generated by combining two 2×4 blocks 1420 and 1422 of transform region R4 1412. Although the transform block with the size of 2×8 is illustrated as being generated in FIG. 14, a transform block with a size of 4×4 or 8×2 may be generated in some embodiments.

In FIG. 14, the residual signals of transform regions R1 and R2 1406 and 1408 are reordered in the transform block with a size of 2×8. However, In some embodiments, transform regions R1 and R2 1406 and 1408 may be determined to be transform blocks with a size of 4×4 without residual signal reordering.

An embodiment of a residual signal reordering method for a vertical right quadrangle binary tree structure was described in FIG. 14. The embodiment of FIG. 14 may also be applied to a vertical left quadrangle binary tree structure, a horizontal up quadrangle binary tree structure, and a horizontal down quadrangle binary tree structure. However, depending on the split boundary, transform regions R1, R2, R3, and R4 may be determined differently from FIG. 14. Specifically, transform region R3 may be set to correspond to a 4×2 block or a 2×4 block through which the split boundary passes. In addition, transform region R4 may be set to correspond to a 4×2 block or a 2×4 block through which the split boundary does not pass. Transform regions R1 and R2 may be set to correspond to two 4×4 blocks through which the split boundary does not pass. Also, in the case of the horizontal up quadrangle binary tree structure and the horizontal down quadrangle binary tree structure, since the boundary of the transform region is close to the horizontal direction, the size of the transform region may be determined to be 4×2 or 4×4, and the size of the transform block may be determined to be 8×2 or 4×4.

Figure 15:
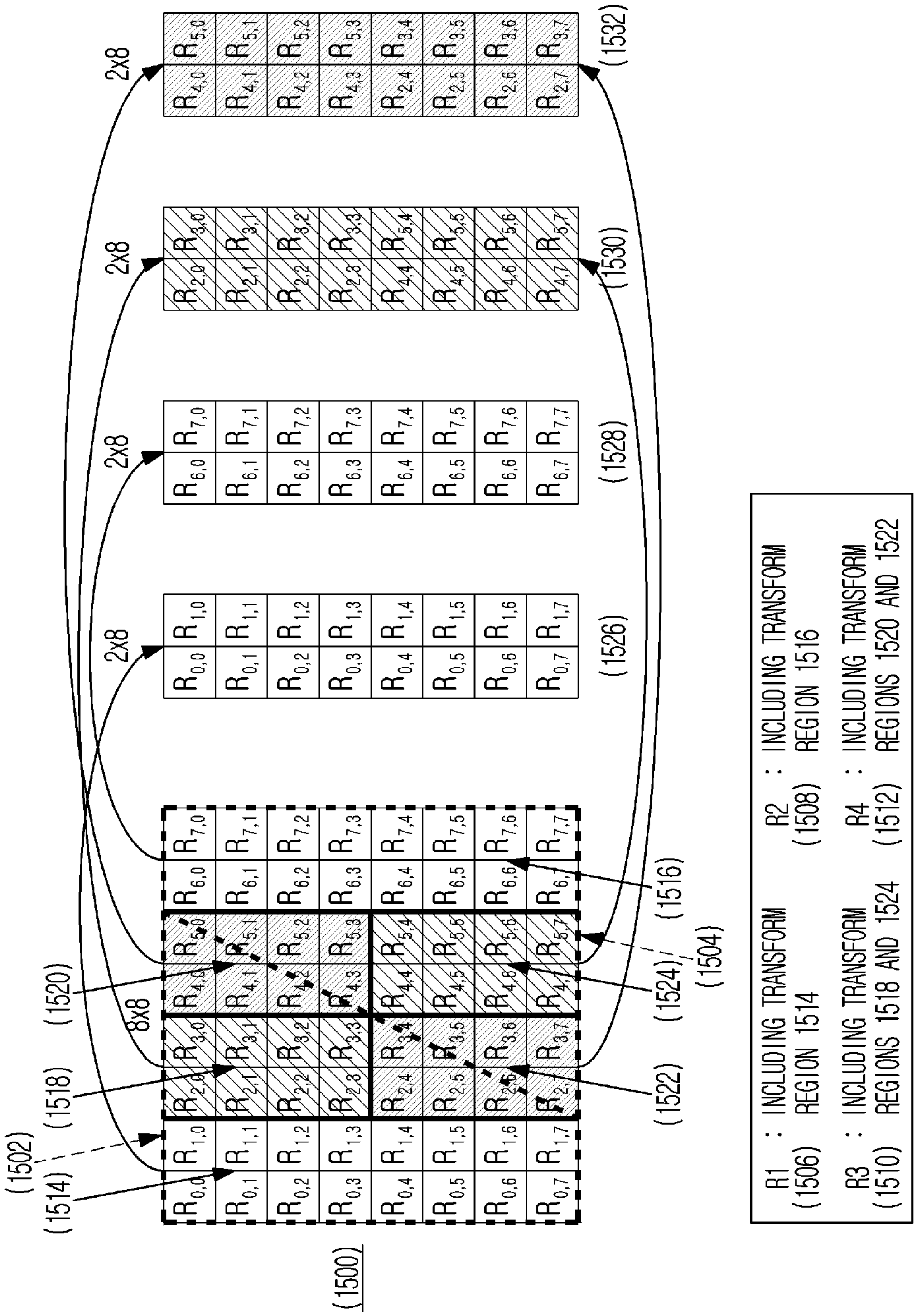
FIG. 15 illustrates another embodiment of a method of reordering residual signals in four transform blocks in a vertical right quadrangle binary tree structure.

FIG. 15 illustrates another embodiment of a method of reordering residual signals in four transform blocks in a vertical right quadrangle binary tree structure.

According to FIG. 15, an upper block 1500 is split into two rectangle blocks 1502 and 1504. In addition, in order to reorder the residual signals included in the rectangle blocks 1502 and 1504, transform regions R1, R2, R3 and R4 1506, 1508, 1510 and 1512 are determined. To determine the transform regions, the upper block 1500 may be split into two 2×8 blocks 1514 and 1516 and four 2×4 blocks 1518, 1520, 1522 and 1524, as illustrated in FIG. 15.

According to FIG. 15, transform region R1 1506 may be composed of a 2×8 block 1514. In addition, transform region R2 1508 may be composed of a 2×8 block 1516. Transform region R3 1510 may be composed of two 2×4 blocks 1518 and 1524. Transform region R4 1512 may be composed of two 2×4 blocks 1520 and 1522.

Based on transform regions R1, R2, R3 and R4 1506, 1508, 1510 and 1512, transform blocks 1526, 1528, 1530 and 1532 may be determined. The transform region R1 1506 may be determined to be a transform block 1526 with a size of 2×8. In addition, the transform region R2 1508 may be determined to be a transform block 1528 with a size of 2×8. Although, in FIG. 15, a transform block with a size of 2×8 is illustrated as being generated, a transform block with a size of 4×4 or 8×2 may be generated as residual signal reordering is performed.

The residual signals of transform region R3 1510 may be scanned in the horizontal zigzag scan order, and the scanned residual signals are ordered in the horizontal zigzag scan order, thereby generating a transform block 1530 with a size of 2×8. The residual signals of transform region R4 1512 may be scanned in the horizontal zigzag scan order, and the scanned residual signals are ordered in the horizontal zigzag scan order, thereby generating a transform block 1532 with a size of 2×8. Although a transform block with a size of 2×8 is illustrated as being generated in FIG. 15, a transform block with a size of 4×4 or 8×2 may also be generated as residual signal reordering is performed.

FIG. 15 illustrates an embodiment of a residual signal reordering method for a vertical right quadrangle binary tree structure. The embodiment of FIG. 15 may also be applied to a vertical left quadrangle binary tree structure, a horizontal up quadrangle binary tree structure, and a horizontal down quadrangle binary tree structure. However, depending on the split boundary, transform regions R1, R2, R3, and R4 may be determined differently from FIG. 15. Specifically, transform region R4 may be set to correspond to a 4×2 block or a 2×4 block through which the split boundary passes. In addition, transform region R3 may be set to correspond to a 4×2 block or a 2×4 block through which the split boundary does not pass. Transform regions R1 and R2 may be set to correspond to two 8×2 blocks or 2×8 blocks through which the split boundary does not pass. In addition, in the case of the horizontal up quadrangle binary tree structure and the horizontal down quadrangle binary tree structure, since the boundary of the transform region is close to the horizontal direction, the size of the block constituting the transform region may be determined to be 4×2 or 8×2, and the size of the transform block may be determined to be 8×2 or 4×4.

Figure 16:
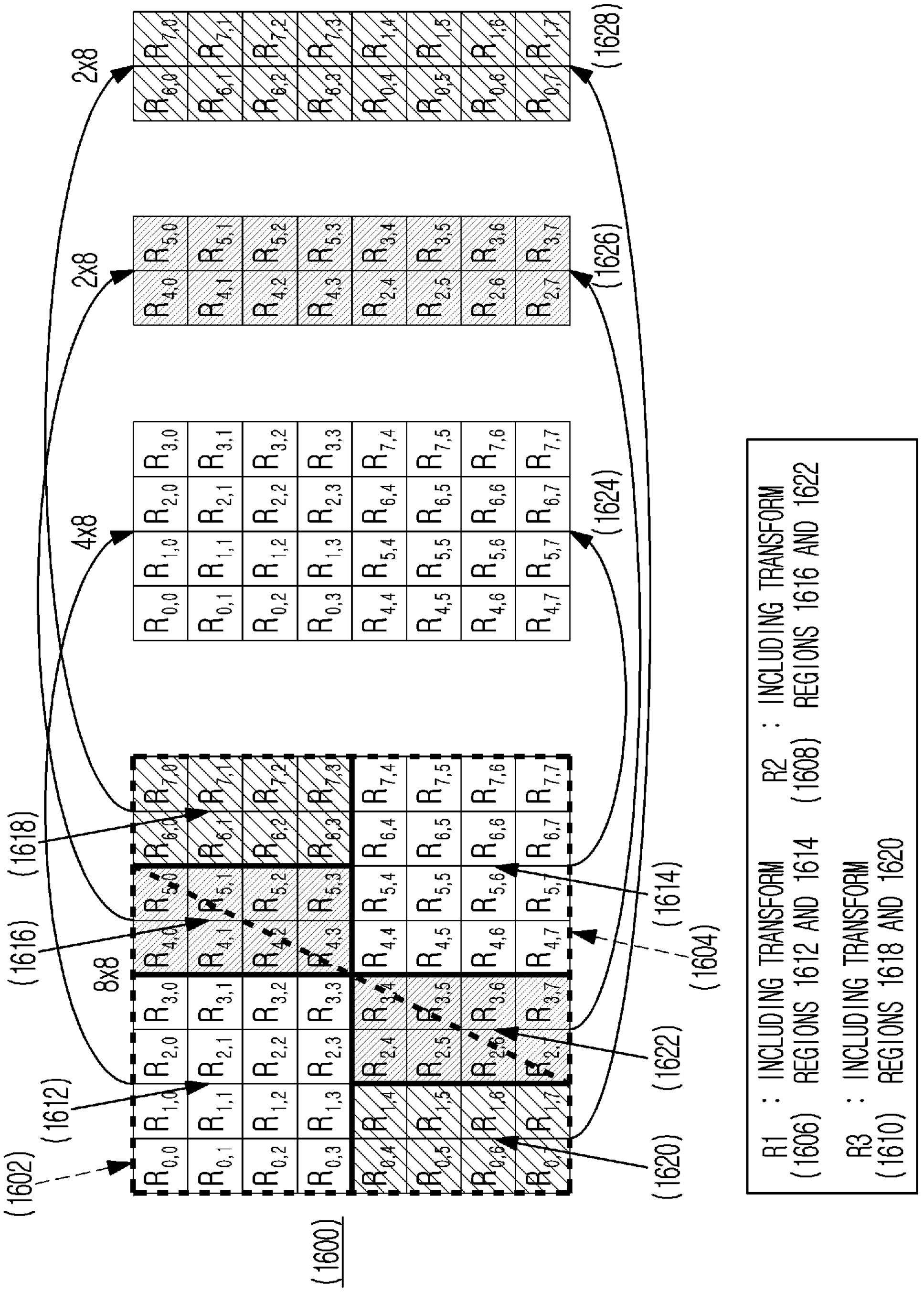
FIG. 16 illustrates an embodiment of a method of reordering residual signals in three transform blocks in a vertical right quadrangle binary tree structure.

FIG. 16 illustrates an embodiment of a method of reordering residual signals in three transform blocks in a vertical right quadrangle binary tree structure.

According to FIG. 16, an upper block 1600 is split into two rectangle blocks 1602 and 1604. In addition, in order to reorder the residual signals included in the rectangle blocks 1602 and 1604, transform regions R1, R2, and R3 1606, 1608 and 1610 are determined. To determine the transform region, the upper block 1600 may be split into two 4×4 blocks 1612 and 1614 and four 2×4 blocks 1616, 1618, 1620 and 1622, as illustrated in FIG. 14.

According to FIG. 16, transform region R1 1606 may be composed of two 4×4 blocks 1612 and 1614. In addition, transform region R2 1608 may be composed of two 2×4 blocks 1616 and 1622. Transform region R3 1610 may be composed of two 2×4 blocks 1618 and 1620.

Based on transform regions R1, R2, and R3 1606, 1608 and 1610, transform blocks 1624, 1626 and 1628 may be determined. The residual signals of transform region R1 1606 may be scanned in the horizontal zigzag scan order, and the scanned residual signal may be ordered in the transform block 1624 with a size of 4×8 in the horizontal zigzag scan order. In some embodiments, the residual signals of transform region R1 1606 may be ordered in a transform block with a size of 8×4.

In addition, the residual signals of transform region R2 1608 may be scanned in the horizontal zigzag scan order, and the scanned residual signal may be ordered in the transform block 1626 with a size of 2×8 by combining two 2×4 blocks 1616 and 1622 in the horizontal zigzag scan order. The residual signals of transform region R3 1610 may be scanned in the horizontal zigzag scan order, and the scanned residual signal may be ordered in the transform block 1628 with a size of 2×8 by combining two 2×4 blocks 1618 and 1620 in the horizontal zigzag scan order. In some embodiments, the residual signals of transform regions R2 and R3 1608 and 1610 may be ordered in a transform block with a size of 4×4 or 8×2.

FIG. 16 illustrates an embodiment of a residual signal reordering method for a vertical right quadrangle binary tree structure. The embodiment of FIG. 16 may also be applied to a vertical left quadrangle binary tree structure, a horizontal up quadrangle binary tree structure, and a horizontal down quadrangle binary tree structure. However, depending on the split boundary, transform regions R1, R2, and R3 may be determined differently from FIG. 16. Specifically, transform region R1 may be set to correspond to two 4×4 blocks through which the split boundary does not pass. In addition, transform region R2 may be set to correspond to a 4×2 block or a 2×4 block through which the split boundary passes. In addition, transform region R3 may be set to correspond to a 4×2 block or a 2×4 block through which the split boundary does not pass. In addition, in the case of the horizontal up quadrangle binary tree structure and the horizontal down quadrangle binary tree structure, since the boundary of the transform region is close to the horizontal direction, the size of the block constituting the transform region may be determined to be 4×2 or 4×4, and the size of the transform block corresponding to transform region R1 may be determined to be 8×4, and the sizes of the transform blocks corresponding to transform regions R2 and R3 may be determined to be 8×2 or 4×4.

In FIGS. 13 to 16, the residual signal scan of the transform region is performed in a horizontal zigzag scan order, but may be performed in any other arbitrary scan order (vertical zigzag scan, diagonal zigzag scan, right or left horizontal scan, down or up vertical scan, arbitrary scan, etc.).

In FIGS. 13 to 16, the residual signals scanned in the transform region are ordered in the transform block in the horizontal zigzag scan order, but the residual signals may be reordered in the transform block based on any other arbitrary scan order (vertical zigzag scan, diagonal zigzag scan, right or left horizontal scan, down or up vertical scan, arbitrary scan, etc.). The scan order applied to residual signal reordering may be different from the scan order used to scan the residual signals in the transform region.

Although the residual signal reordering is described based on a block with a size of 8×8 in FIGS. 13 to 16, the transform region and the transform block may be determined by the method of FIGS. 13 to 16 for larger blocks such as 16×16, 32×32, and 64×64.

Figure 17:
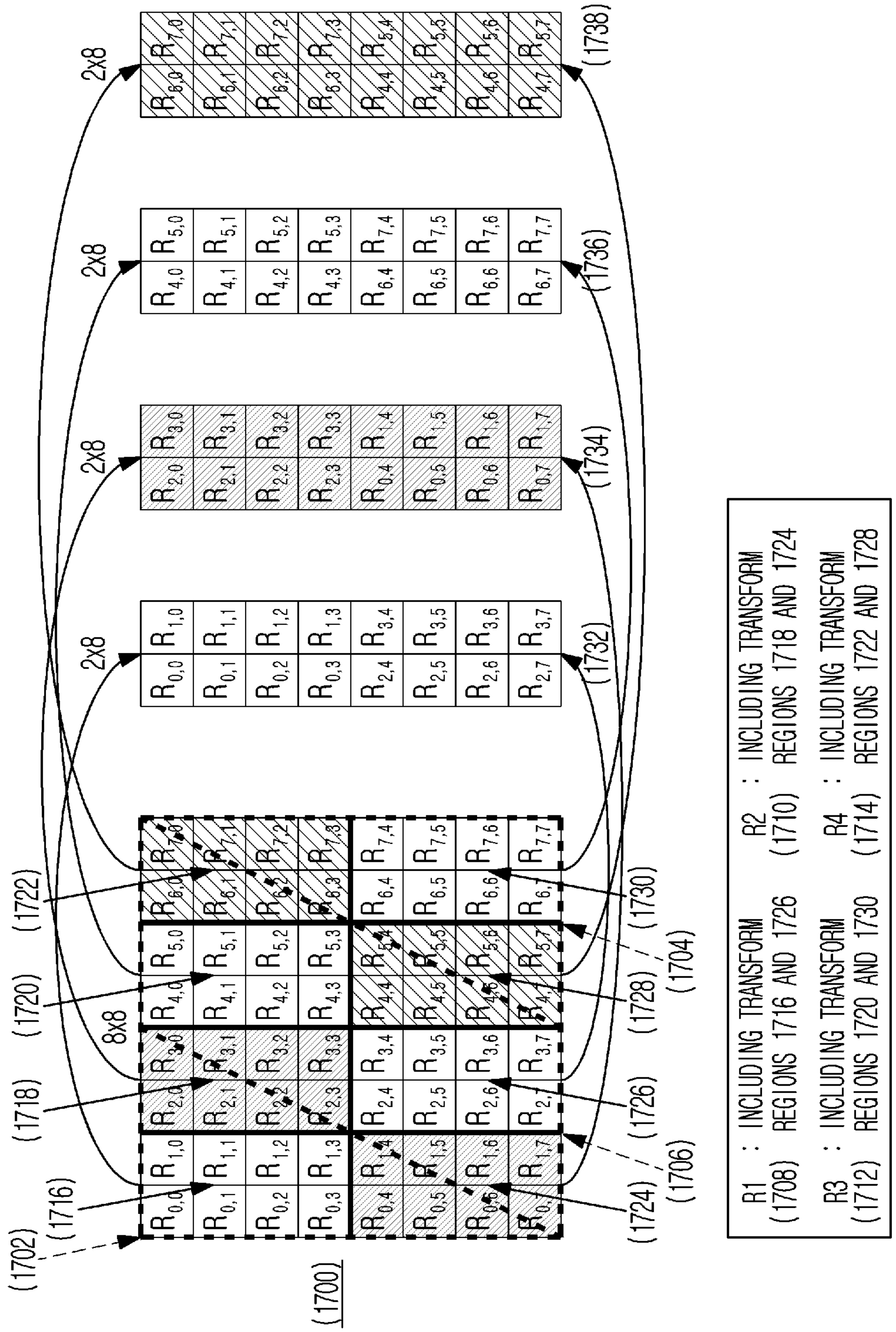
FIG. 17 illustrates an embodiment of a method of reordering residual signals in four transform blocks in a vertical right ternary tree structure.
Figure 18:
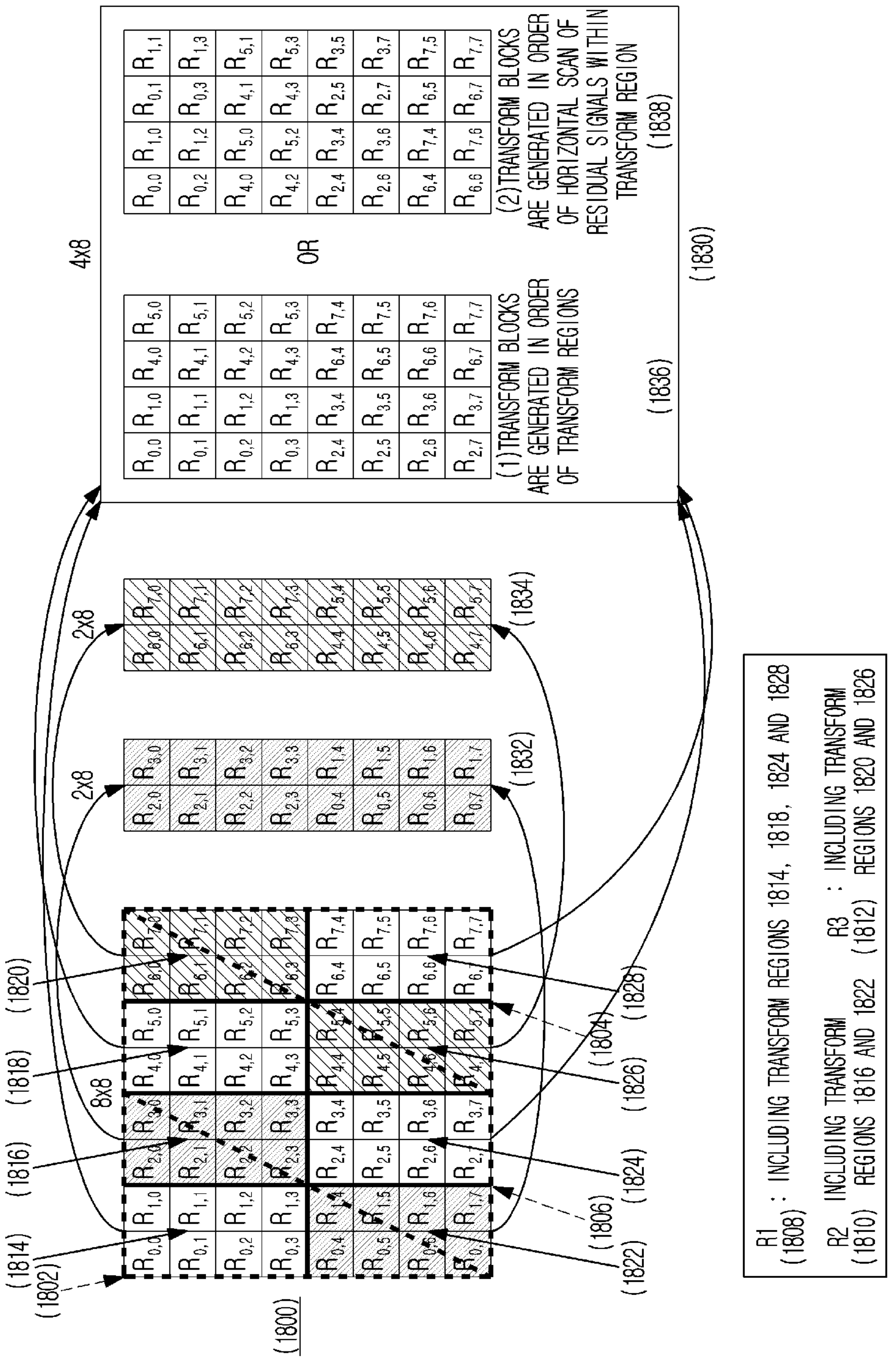
FIG. 18 illustrates an embodiment of a method of reordering residual signals in three transform blocks in an asymmetric ternary tree structure.

FIGS. 17 and 18 illustrate an embodiment of a method of reordering residual signals in an asymmetric ternary tree structure.

FIG. 17 illustrates an embodiment of a method of reordering residual signals in four transform blocks in a vertical right ternary tree structure.

According to FIG. 17, an upper block 1700 is split into two triangle blocks 1702 and 1704 and one parallelogrammatic rectangle block 1706. In addition, in order to reorder residual signals included in the blocks 1702, 1704 and 1706, transform regions R1, R2, R3 and R4 1708, 1710, 1712 and 1714 are determined. To determine the transform region, the upper block 1700 may be split into eight 2×4 blocks 1716, 1718, 1720, 1722, 1724, 1726, 1728 and 1730 as illustrated in FIG. 17.

According to FIG. 17, transform region R1 1708 may be composed of two 2×4 blocks 1716 and 1726. Transform region R2 1710 may be composed of two 2×4 blocks 1718 and 1724. Transform region R3 1712 may be composed of two 2×4 blocks 1720 and 1730. Transform region R4 1714 may be composed of two 2×4 blocks 1722 and 1728.

Based on transform regions R1, R2, R3 and R4 1708, 1710, 1712 and 1714, transform blocks 1732, 1734, 1736 and 1738 may be determined. The residual signals of transform region R1 1708 may be scanned in the horizontal zigzag scan order, and the scanned residual signal may be ordered in the transform block 1732 with a size of 8×2 in the horizontal zigzag scan order. In addition, the residual signals of transform region R2 1710 may be scanned in the horizontal zigzag scan order, and the scanned residual signal may be ordered in the transform block 1734 with a size of 8×2 in the horizontal zigzag scan order. The residual signals of transform region R3 1712 may be scanned in the horizontal zigzag scan order, and the scanned residual signal may be ordered in the transform block 1736 with a size of 8×2 in the horizontal zigzag scan order. In addition, the residual signals of transform region R4 1714 may be scanned in the horizontal zigzag scan order, and the scanned residual signal may be ordered in the transform block 1738 with a size of 8×2 in the horizontal zigzag scan order. In some embodiments, the residual signals of transform regions R1, R2, R3, and R4 1708, 1710, 1712 and 1714 may be reordered in transform blocks with a size of 4×4 or 2×8.

An embodiment of a residual signal reordering method for a vertical right ternary tree structure was described in FIG. 17. However, the embodiment of FIG. 17 may also be applied to a vertical left ternary tree structure, a horizontal up ternary tree structure, and a horizontal down ternary tree structure. However, depending on the split boundary, transform regions R1, R2, R3, and R4 may be determined differently from FIG. 17.

Specifically, in the vertical left ternary tree structure, transform regions R1, R2, R3, and R4 may be set to correspond to two 2×4 blocks 1718 and 1724, two 2×4 blocks 1716 and 1726, two 2×4 blocks 1722 and 1728, and two 2×4 blocks 1720 and 1730, respectively.

In the horizontal up ternary tree structure and the horizontal down ternary tree structure, the upper block 1700 is split into eight blocks with a size of 4×2, and the transform regions R1, R2, R3, and R4 may be determined to include two blocks with a size of 4×2. Accordingly, the transform region of the horizontal asymmetric ternary tree structure may be determined to be the same as the upper block 1700 of FIG. 17 tilted by 90 degrees. In addition, the size of the transform block in which the residual signals of the transform region are reordered may be determined to be 4×4 or 8×2.

FIG. 18 illustrates an embodiment of a method of reordering residual signals in three transform blocks in an asymmetric ternary tree structure.

According to FIG. 18, an upper block 1800 is split into two triangle blocks 1802 and 1804 and one parallelogrammatic rectangle block 1806. In addition, in order to reorder the residual signals included in the blocks 1802, 1804 and 1806, transform regions R1, R2 and R3 1808, 1810 and 1812 are determined. To determine the transform region, the upper block 1800 may be split into eight 2×4 blocks 1814, 1816, 1818, 1820, 1822, 1824, 1826 and 1828 as illustrated in FIG. 18.

According to FIG. 18, transform region R1 1808 may be composed of four 2×4 blocks 1814, 1818, 1824 and 1828. Transform region R2 1810 may be composed of two 2×4 blocks 1816 and 1822. Transform region R3 1812 may be composed of two 2×4 blocks 1820 and 1826.

Based on transform regions R1, R2, and R3 1808, 1810 and 1812, transform blocks 1830, 1832 and 1834 may be determined. According to FIG. 18, residual signals of transform region R1 1808 may be ordered in the transform block 1830 with a size of 4×8 by two methods. According to the first ordering method 1836, the transform block 1830 may be generated by combining four 2×4 blocks 1814, 1818, 1824 and 1828 based on the positions of the transform regions. For example, blocks 1814, 1818, 1824 and 1828 may be combined such that the residual signal of the block 1814 is located at the upper left side of the transform block 1830, the residual signal of the block 1818 is located at the upper right side of the transform block 1830, the residual signal of the block 1824 is located at the lower left side of the transform block 1830, and the residual signal of the block 1828 is located at the lower right side of the transform block 1830. According to the second ordering method 1838, the transform block 1830 may be determined by sequentially scanning four 2×4 blocks 1814, 1818, 1824 and 1828 in the horizontal zigzag scan order, and ordering the scanned residual signals in the transform block 1830 with a size of 4×8 in the horizontal zigzag scan order. In some embodiments, the residual signals of transform region R1 1808 may be ordered in a transform block with a size of 8×4.

The residual signals of transform region R2 1810 may be scanned in the horizontal zigzag scan order, and the scanned residual signal may be ordered in a transform block 1832 with a size of 2×8 in the horizontal zigzag scan order. In addition, the residual signals of transform region R3 1812 may be scanned in the horizontal zigzag scan order, and the scanned residual signal may be ordered in a transform block 1834 with a size of 2×8 in the horizontal zigzag scan order. In some embodiments, the residual signals of transform regions R2 and R3 1810 and 1812 may be ordered in a transform block with a size of 4×4 or 8×2.

An embodiment of a residual signal reordering method for a vertical right ternary tree structure was described in FIG. 18. However, the embodiment of FIG. 18 may also be applied to a vertical left ternary tree structure, a horizontal up ternary tree structure, and a horizontal down ternary tree structure. However, depending on the split boundary, transform regions R1, R2, and R3 may be determined differently from FIG. 18.

Specifically, in the vertical left ternary tree structure, transform regions R1, R2, and R3 may be set to correspond to four 2×4 blocks 1816, 1820, 1822 and 1826, two 2×4 blocks 1814 and 1824, and two 2×4 blocks 1818 and 1828, respectively.

In the horizontal up ternary tree structure and the horizontal down ternary tree structure, the upper block 1800 may be split into eight blocks with a size of 4×2, the transform region R1 may include four blocks with a size of 4×2, and each of R2 and R3 may be determined to include two blocks with a size of 4×2. Accordingly, the transform region of the asymmetric ternary tree structure in the horizontal direction may be determined to be the same as the upper block 1800 of FIG. 18 tilted by 90 degrees. In addition, the size of the transform block in which the residual signals of the transform region are reordered may be determined to be 4×4 or 8×2.

In FIGS. 17 and 18, the residual signal scan of the transform region is performed in the horizontal zigzag scan order, but may be performed in any other arbitrary scan order (vertical zigzag scan, diagonal zigzag scan, right or left horizontal scan, down or up vertical scan, arbitrary scan, etc.).

In FIGS. 17 and 18, the residual signals scanned in the transform region are ordered in the transform block in the horizontal zigzag scan order, but the residual signals may be ordered in the transform block based on any other arbitrary scan order (vertical zigzag scan, diagonal zigzag scan, right or left horizontal scan, down or up vertical scan, arbitrary scan, etc.). The scan order applied to residual signal reordering may be different from the scan order used to scan the residual signals in the transform region.

Although the residual signal reordering is described based on the block with the size of 8×8 in FIGS. 17 to 18, the transform region and the transform block may be determined by the method of FIGS. 17 to 18 for larger blocks such as 16×16, 32×32, and 64×64.

In FIGS. 9 to 18, a method of ordering residual signals of a split region in a transform block in a geometric splitting tree structure was described. In some embodiments, prediction may be performed on a sub block, and transform may be performed on an upper block. If transform is performed on an upper block, residual signal reordering is not performed, and residual signals of the upper block may be transformed.

In addition, in FIGS. 9 to 18, residual signal reordering based on encoding was described. Therefore, in decoding, residual signals generated by inverse transform of a transform block may be reordered in a transform region. In addition, a current block may be reconstructed based on the residual signals of the transform region.

Hereinafter, FIGS. 19 to 22 illustrate a syntax structure for determining a block splitting method reflecting the geometric splitting tree structure proposed in FIGS. 5 to 7. In FIGS. 19 to 22, QT represents a quad tree, MTT represents a multi-type tree, TQT represents a triangle quad tree, BT represents a binary tree, TT represents a ternary tree, GBT represents a geometric binary tree, and ATT represents an asymmetric ternary tree. In addition, in FIGS. 19 to 22, a circular node represents a branching point related to selection of a tree splitting structure.

Figure 19:
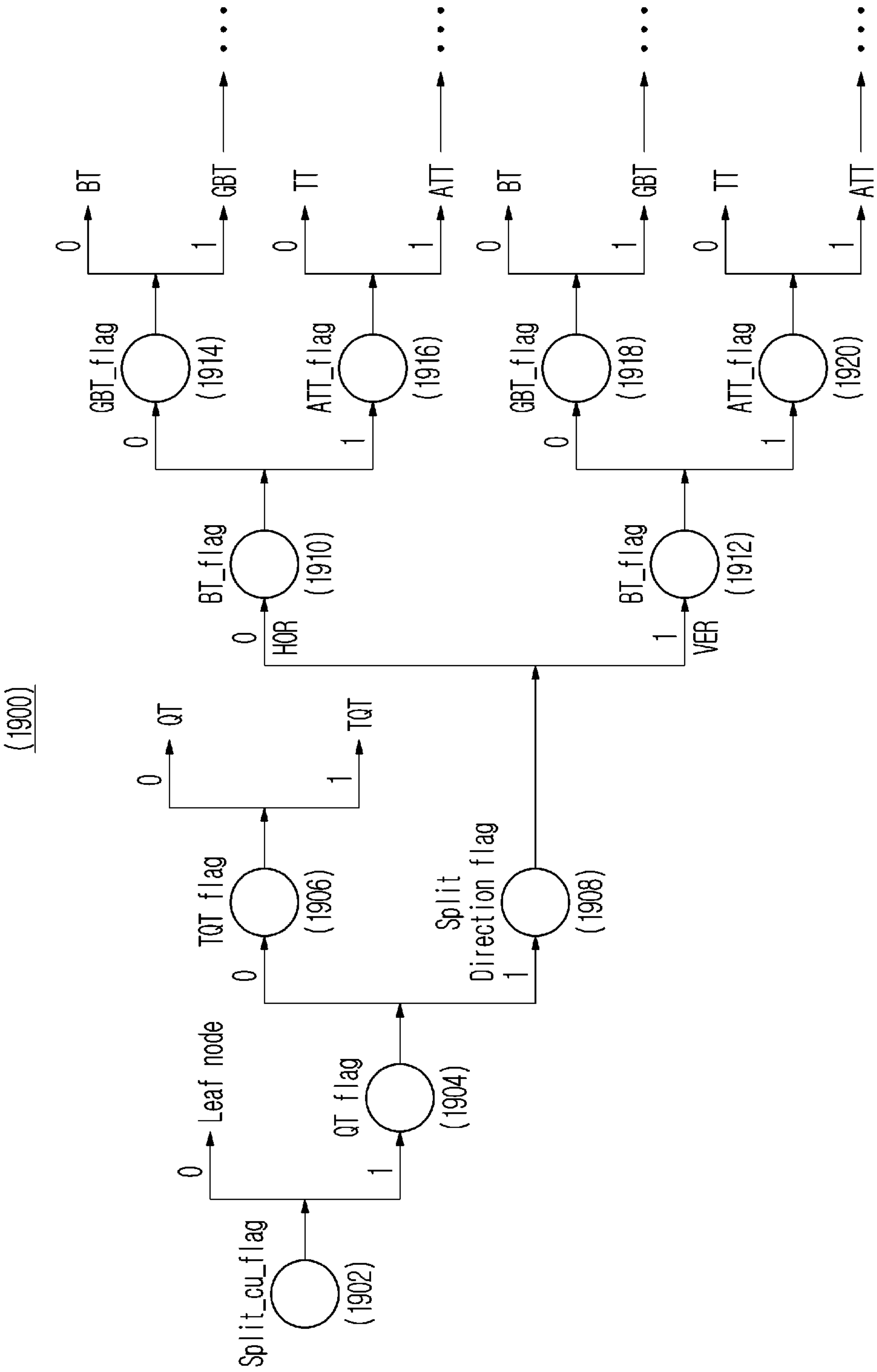
FIG. 19 shows an embodiment of a syntax structure for determining a block splitting method reflecting a geometric splitting tree structure.

FIG. 19 shows an embodiment 1900 of a syntax structure for determining a block splitting method reflecting a geometric splitting tree structure.

At node 1902, it is determined whether a current block is split. Whether the current block is split may be determined based on a split flag or characteristics of the current block (size, shape, color component, slice type, etc.). When the split flag indicates 0, it may be determined that the current block is not split. Conversely, when the split flag indicates 1, it may be determined that the current block is split. In some embodiments, it may be determined that the current block is split when the split flag indicates 0 and the current block is not split when the split flag indicates 1.

Upon determining that the current block is not split, the current block is determined to be a leaf node. Prediction and transform, etc. are performed on the current block determined to be a leaf node. Conversely, upon determining that the current block is split, node 1904 is performed to determine a method of splitting the current block.

At node 1904, the method of splitting the current block among a quad tree structure and a multi-type tree structure is determined. The determination of node 1904 may be made according to a quad tree flag (QT flag) or characteristics (size, shape, color component, slice type, etc.) of the current block. When the quad tree flag indicates 0, it may be determined that the current block is split according to the quad tree structure. Conversely, when the quad tree flag indicates 1, it may be determined that the current block is split according to the multi-type tree structure. In some embodiments, when the quad tree flag indicates 0, a multi-type tree structure may be selected for the current block, and when the quad tree flag indicates 1, a quad tree structure may be selected for the current block.

Upon determining that the current block is split according to the quad tree structure, node 1906 is performed to determine the type of the quad tree structure of the current block. Conversely, Upon determining that the current block is split according to the multi-type tree structure, node 1908 is performed to determine the type of the multi-type tree structure of the current block.

At node 1906, the method of splitting the current block among the rectangle quad tree structure and the triangle quad tree structure is determined. The determination of node 1906 may be made according to a triangle quad tree flag (TQT flag) or characteristics (size, shape, color component, slice type, etc.) of the current block. When the triangle quad tree flag indicates 0, it may be determined that the current block is split according to the rectangle quad tree structure. Conversely, when the triangle quad tree flag indicates 1, it may be determined that the current block is split according to the triangle quad tree structure. In some embodiments, when the triangle quad tree flag indicates 0, the triangle quad tree structure may be selected for the current block, and when the triangle quad tree flag indicates 1, the rectangle quad tree structure may be selected for the current block.

When the splitting method is selected at node 1906, the current block is split according to the rectangle quad tree structure or the triangle quad tree structure. If the current block is split according to the rectangle quad tree structure, the sub block may be additionally split if a condition allowing splitting is satisfied. However, if the current block is split according to the triangle quad tree structure, the sub block may no longer be split.

If the triangle quad tree structure is not allowed for the current block, node 1906 is omitted, and the current block is split according to the rectangle quad tree structure. In addition, in the case of an embodiment where the triangle quad tree structure is not used, node 1906 is also omitted, and the current block is split according to the rectangle quad tree structure.

At node 1908, the split direction of the current block is determined among the vertical direction and the horizontal direction. The determination of the node 1908 may be made according to a split direction flag or the characteristics (size, shape, color component, slice type, etc.) of the current block.

When the split direction flag indicates 0, the split direction of the current block may be determined to be the horizontal direction. Conversely, when the split direction flag indicates 1, the split direction of the current block may be determined to be the vertical direction. In some embodiments, when the split direction flag indicates 0, the split direction of the current block may be determined to be the vertical direction, and when the split direction flag indicates 1, the split direction of the current block may be determined to be the horizontal direction.

Upon determining that the current block is split in the horizontal direction, node 1910 is performed to determine the type of the tree structure of the current block among the tree structures in the horizontal direction. Conversely, upon determining that the current block is split in the vertical direction, node 1912 is performed to determine the type of the tree structure of the current block among the tree structures in the vertical direction. In FIG. 19, the split direction is determined before determining the number of blocks to be split and whether geometric splitting is applied. However, in some embodiments, the split direction may be determined after the number of blocks to be split is determined. Also, in some embodiments, the split direction may be determined after determining both the number of blocks to be split and whether geometric splitting is applied. Alternatively, in some embodiments, the split direction may be determined at the end of the block splitting method.

At node 1910, the method of splitting the current block among the binary tree structure and the ternary tree structure is determined. The determination of the node 1910 may be made according to a binary tree flag (BT flag) or characteristics (size, shape, color component, slice type, etc.) of the current block. When the binary tree flag indicates 0, it may be determined that the current block is split according to the binary tree structure. Conversely, when the binary tree flag indicates 1, it may be determined that the current block is split according to the ternary tree structure. In some embodiments, when the binary tree flag indicates 0, it may be determined that the current block is split according to the ternary tree structure, and when the split direction flag indicates 1, it may be determined that the current block is split according to the binary tree structure.

Upon determining that the current block is split according to the binary tree structure, node 1914 is performed to determine the type of the tree structure of the current block among the binary tree structures in the horizontal direction. Conversely, upon determining that the current block is split according to a ternary tree structure, node 1916 is performed to determine the type of the tree structure of the current block among the ternary tree structures in the horizontal direction.

At node 1912, like node 1910, the method of splitting the current block among the binary tree structure and the ternary tree structure is determined. The binary tree flag of node 1912 is the same syntax element as the binary tree flag of node 1910.

Upon determining that the current block is split according to the binary tree structure, node 1918 is performed to determine the type of the tree structure of the current block among the binary tree structures in the vertical direction. Conversely, upon determining that the current block is split according to the ternary tree structure, node 1920 is performed to determine the type of the tree structure of the current block among the ternary tree structures in the vertical direction.

At node 1914, the method of splitting the current block among the rectangle binary tree structure and the geometric binary tree structure is determined. The determination of node 1914 may be made according to a geometric binary tree flag (GBT flag) or characteristics (size, shape, color component, slice type, etc.) of the current block. When the geometric binary tree flag indicates 0, it may be determined that the current block is split according to the rectangle binary tree structure. Conversely, when the geometric binary tree flag indicates 1, it may be determined that the current block is split according to the geometric binary tree structure. In some embodiments, when the geometric binary tree flag indicates 0, it may be determined that the current block is split according to the geometric binary tree structure, and when the binary tree flag indicates 1, it may be determined that the current block is split according to the rectangle binary tree structure.

Upon determining that the current block is split according to the rectangle binary tree structure, the current block is split according to the horizontal rectangle binary tree structure. Conversely, upon determining that the current block is split according to the geometric binary tree structure, the current block is split according to the geometric binary tree structure in the horizontal direction. As illustrated in FIG. 6, two or more geometric binary tree structures in the horizontal direction may be allowed for the current block. Therefore, when there are two or more geometric binary tree structures in the horizontal direction allowed for the current block, the geometric binary tree structure of the current block may be selected according to the geometric binary tree structure determination method of FIG. 21.

AT node 1916, the method of splitting the current block among the rectangle ternary tree structure and the asymmetric ternary tree structure is determined. The determination of node 1916 may be made according to an asymmetric ternary tree flag (ATT_flag) or characteristics (size, shape, color component, slice type, etc.) of the current block. When the asymmetric ternary tree flag indicates 0, it may be determined that the current block is split according to the rectangle ternary tree structure. Conversely, when the asymmetric ternary tree flag indicates 1, it may be determined that the current block is split according to the asymmetric ternary tree structure. In some embodiments, when the asymmetric ternary tree flag indicates 0, it may be determined that the current block is split according to the asymmetric ternary tree structure, and when the asymmetric ternary tree flag indicates 1, it may be determined that the current block is split according to the rectangle ternary tree structure.

Upon determining that the current block is according to the rectangle ternary tree structure, the current block is split according to the rectangle ternary tree structure in the horizontal direction. Conversely, upon determining that the current block is split according to the asymmetric ternary tree structure, the current block is split according to the asymmetric ternary binary tree structure in the horizontal direction. As illustrated in FIG. 7, two or more horizontal asymmetric ternary tree structures may be allowed for the current block. Therefore, when there are two or more asymmetric ternary tree structures in the horizontal direction allowed for the current block, the asymmetric ternary tree structure of the current block may be selected according to the asymmetric ternary tree structure determination method of FIG. 22.

At node 1918, similar to node 1914, the method of splitting the current block among the rectangle binary tree structure and the geometric binary tree structure is determined. The geometric binary tree flag of node 1918 is the same as the geometric binary tree flag of node 1914.

Upon determining that the current block is split according to the rectangle binary tree structure, the current block is split according to the vertical rectangle binary tree structure. Conversely, upon determining that the current block is split according to the geometric binary tree structure, the current block is split according to the geometric binary tree structure in the vertical direction. As illustrated in FIG. 6, two or more geometric binary tree structures in the vertical direction may be allowed for the current block. Therefore, when there are two or more vertical geometric binary tree structures allowed for the current block, the geometric binary tree structure of the current block may be selected according to the geometric binary tree structure determination method of FIG. 21.

At node 1920, similarly to node 1916, the method of splitting the current block among the rectangle ternary tree structure and the asymmetric ternary tree structure is determined. The asymmetric ternary tree flag of node 1920 is the same as the asymmetric ternary tree flag of node 1916.

Upon determining that the current block is split according to the rectangle ternary tree structure, the current block is split according to the ternary tree structure in the vertical direction. Conversely, upon determining that the current block is split according to the asymmetric ternary tree structure, the current block is split according to the asymmetric ternary tree structure in the vertical direction. As illustrated in FIG. 7, two or more asymmetric ternary tree structures in the vertical may be allowed for the current block. Therefore, when there are two or more asymmetric ternary tree structures in the vertical direction allowed for the current block, the asymmetric ternary tree structure of the current block may be selected according to the asymmetric ternary tree structure determination method of FIG. 22.

If the geometric binary tree structure is not allowed for the current block, nodes 1914 and 1918 are omitted, and the current block is split according to the rectangle binary tree structure. Also, in the case of an embodiment where the geometric binary tree structure is not used, nodes 1914 and 1918 are omitted, and the current block is split according to the rectangle binary tree structure.

If the asymmetric ternary tree structure is not allowed for the current block, nodes 1916 and 1920 are omitted, and the current block is split according to the rectangle ternary tree structure. Also, in the case of an embodiment where the asymmetric ternary tree structure is not used, nodes 1916 and 1920 are omitted, and the current block is split according to the rectangle ternary tree structure.

As mentioned above, some of the geometric splitting tree structures may not be used for block splitting. Accordingly, in one embodiment of image encoding and decoding, nodes 1906, 1914, 1916, 1918 and 1920 may be omitted, depending on which geometric splitting tree structures are included as encoding tools.

For example, if only a triangle quad tree structure is included in the embodiment, only node 1906 is activated, and nodes 1914, 1916, 1918, and 1920 may be omitted. Accordingly, the step of selecting a binary tree and a geometric binary tree and the step of selecting a ternary tree and an asymmetric ternary tree may be omitted.

As another example, if only a geometric binary tree structure is included in the embodiment, only nodes 1914 and 1918 may be activated, and nodes 1906, 1916, and 1920 may be omitted. Accordingly, the step of selecting the quad tree and the triangle quad tree and the step of selecting the ternary tree and the asymmetric ternary tree may be omitted.

As another example, if only an asymmetric ternary tree structure is included in the embodiment, only nodes 1916 and 1920 may be activated, and nodes 1906, 1914, and 1918 may be omitted. Accordingly, the steps of selecting the quad tree and the triangle quad tree and the step of selecting the binary tree and the geometric binary tree may be omitted.

In addition, even if the geometric splitting tree structure is included as an encoding tool in the embodiment, upon determining that the geometric splitting tree structure is not allowed in an upper data unit such as a sequence parameter set, a picture parameter set, a slice header, a coding tree unit, etc., the geometric splitting tree structure that is not allowed may be excluded from the block splitting of the current block. In addition, depending on the characteristics (size, shape, color component, slice type, etc.) of the current block, the geometric splitting tree structure that is not allowed may be excluded from the block splitting of the current block.

According to FIG. 19, whether the current block is split by a quad tree structure is first determined. However, whether the current block is split by a ternary tree structure may be determined first. Similarly, whether the current block is split by a binary tree structure may be determined first. In the syntax structure for determining a splitting structure, by first determining whether a splitting structure with a high probability of use is applied, the amount of data required for determining a splitting structure can be reduced.

Figure 20:
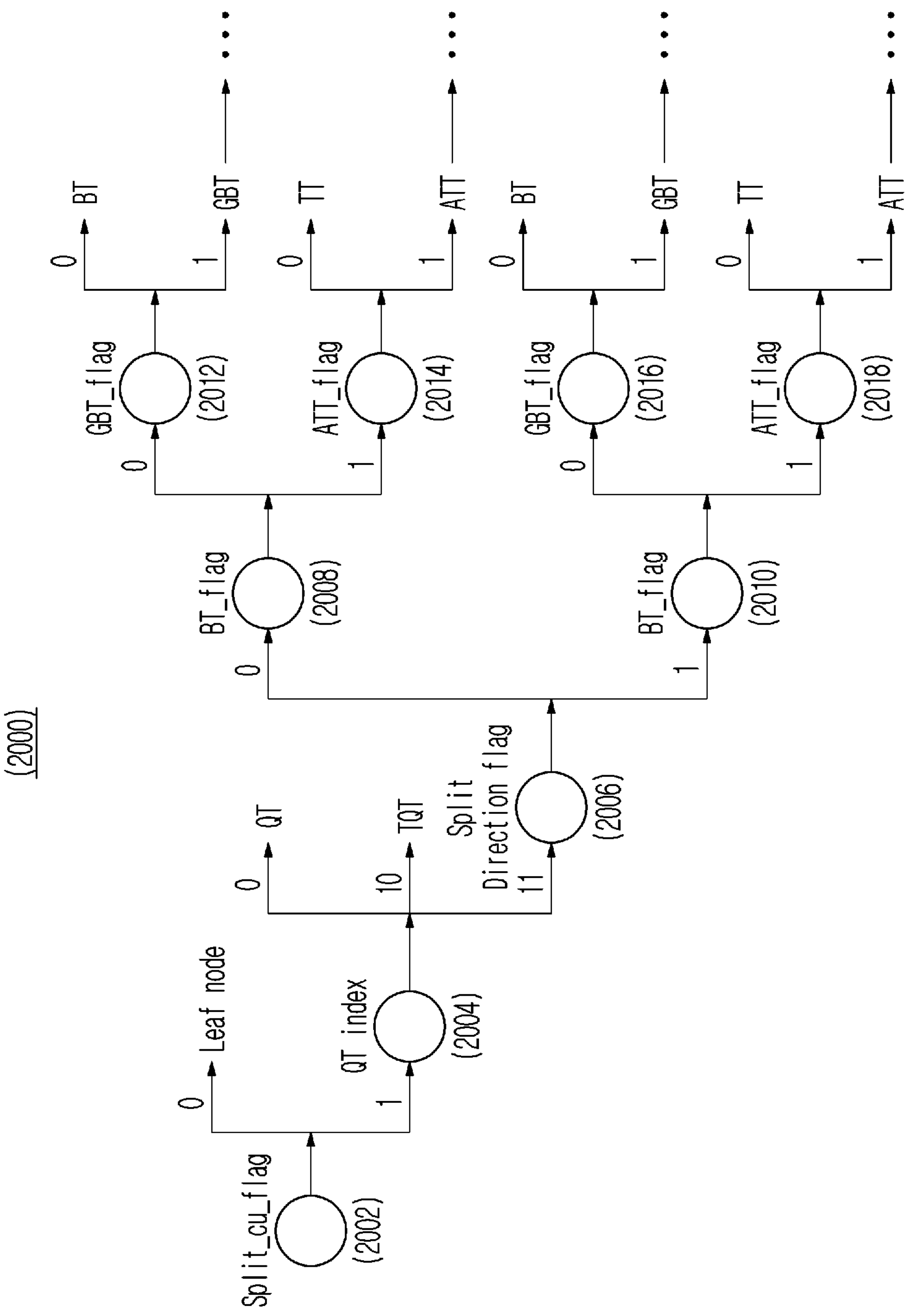
FIG. 20 shows an embodiment of a syntax structure for determining a block splitting method reflecting a geometric splitting tree structure.

FIG. 20 shows an embodiment 2000 of a syntax structure for determining a block splitting method reflecting a geometric splitting tree structure.

Unlike FIG. 19, in FIG. 20, the method of splitting the current block among the rectangle quad tree structure, the triangle quad tree structure, and the multi-type tree structure is determined according to the quad tree/multi-type tree index (QT/MTT index) at node 2004. The determination of node 2004 may be made according to the quad tree/multi-type tree index or the characteristics (size, shape, color component, slice type, etc.) of the current block. When the quad tree/multi-type tree index indicates 0, it may be determined that the current block is split according to the rectangle quad tree structure. When the quad tree/multi-type tree index indicates 10, it may be determined that the current block is split according to the triangle quad tree structure. When the quad tree/multi-type tree index indicates 11, it may be determined that the current block is split according to the multi-type tree structure. However, in some embodiments, the tree structure indicated by the symbol indicated by the quad tree/multi-type tree index may be set differently from FIG. 20.

Nodes 2002, 2006, 2008, 2010, 2012, 2014, 2016, and 2018 of FIG. 20 may perform the same function as nodes 1902, 1908, 1910, 1912, 1914, 1916, 1918, and 1920 of FIG. 19, respectively.

Figure 21:
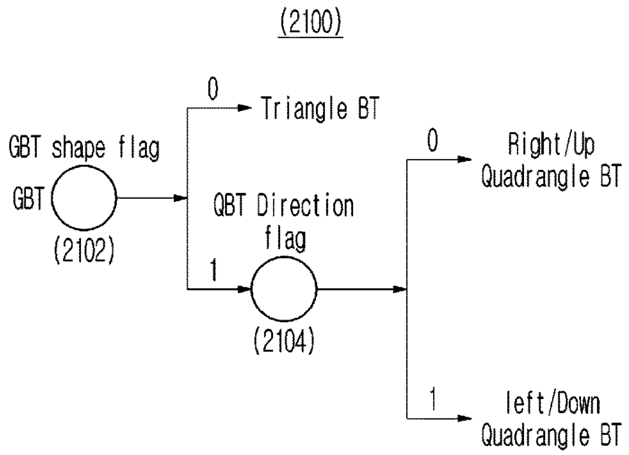
FIG. 21 shows an embodiment of a syntax structure for determining a geometric binary tree structure.

FIG. 21 shows an embodiment of a syntax structure for determining a geometric binary tree structure.

Upon determining that the current block is split by a geometric binary tree structure in nodes 1914, 1918, 2012, and 2016, and there are two or more geometric binary tree structures allowed for the current block, the geometric binary tree structure of the current block may be selected from among the two or more geometric binary tree structures according to the geometric binary tree structure determination method of FIG. 21.

According to node 2102, a method of splitting a current block among a triangle binary tree structure and a quadrangle binary tree structure is determined. The determination of node 2012 may be made according to a GBT shape flag or characteristics (size, shape, color component, slice type, etc.) of the current block. When the GBT shape flag indicates 0, it may be determined that the current block is split according to the triangle binary tree structure. Conversely, when the GBT shape flag indicates 1, it may be determined that the current block is split according to the quadrangle binary tree structure. In some embodiments, when the GBT shape flag indicates 0, the quadrangle binary tree structure may be selected for the current block, and when the GBT shape flag indicates 1, the triangle binary tree structure may be selected for the current block.

Upon determining that the current block is split according to the triangle binary tree structure, the current block is split according to the triangle binary tree structure. If, in FIG. 19 or 20, the split direction is determined to be the vertical direction, the current block is split according to the vertical triangle binary tree structure. In addition, if the split direction is determined to be the horizontal direction, the current block is split according to the horizontal triangle binary tree structure.

Upon determining that the current block is split according to the quadrangle binary tree structure, node 2104 is performed to determine the quadrangle binary tree direction of the current block.

According to node 2104, the quadrangle binary tree direction of the current block is determined. The determination of the node 2104 may be made according to a quadrangle binary tree direction flag (QBT direction flag) or characteristics (size, shape, color component, slice type, etc.) of the current block. When the quadrangle binary tree direction flag indicates 0, it may be determined that the current block is split according to a quadrangle binary tree structure in a right or up direction. Conversely, when the quadrangle binary tree direction flag indicates 1, it may be determined that the current block is split according to a quadrangle binary tree structure in a left or down direction. In some embodiments, a tree structure indicated by a symbol of the quadrangle binary tree direction flag may be set opposite to the quadrangle binary tree direction flag of FIG. 21.

If the split direction is vertical and the quadrangle binary tree direction is right, the current block may be split according to the vertical right quadrangle binary tree. In addition, if the split direction is vertical and the quadrangle binary tree direction is left, the current block may be split according to the vertical left quadrangle binary tree. If the split direction is horizontal and the quadrangle binary tree direction is up, the current block may be split according to the horizontal up quadrangle binary tree. In addition, if the split direction is horizontal and the quadrangle binary tree direction is down, the current block may be split according to the horizontal down quadrangle binary tree.

Some of the geometric binary tree structures may not be used for block splitting. Therefore, in one embodiment of image encoding and decoding, depending on which geometric binary tree structure is included as an encoding tool, nodes 2102 and/or 2104 may be omitted.

For example, if only a triangle binary tree is included in the embodiment, nodes 2102 and 2104 are not activated. Therefore, the method according to FIG. 21 is not performed, and the current block may be split according to a vertical or horizontal triangle binary tree.

In another example, if only a quadrangle binary tree is included in the embodiment, node 2102 is not activated.

Therefore, only the quadrangle binary tree direction is determined at node 2104. If the quadrangle binary tree direction is fixed to one, node 2104 is also omitted, so that the method according to FIG. 21 may not be performed.

In addition, even if it is a geometric binary tree structure included as an encoding tool in the embodiment, upon determining that a specific geometric binary tree structure is not allowed in an upper data unit such as a sequence parameter set, a picture parameter set, a slice header, a coding tree unit, etc., the geometric binary tree structure that is not allowed may be excluded from the block splitting of the current block. In addition, depending on the characteristics (size, shape, color component, slice type, etc.) of the current block, the geometric binary tree structure that is not allowed may be excluded from the block splitting of the current block.

The current block may be split according to a geometric binary tree structure, and the sub blocks determined by the splitting of the current block may be encoded or decoded without being additionally split.

Figure 22:
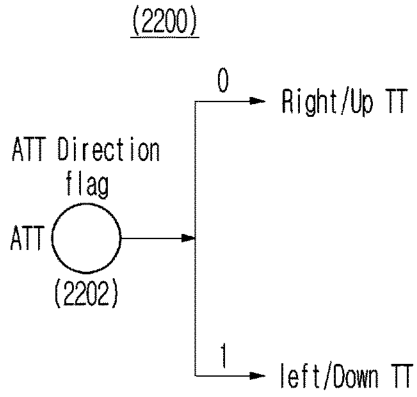
FIG. 22 shows an embodiment of a syntax structure for determining an asymmetric ternary tree structure.

FIG. 22 shows an embodiment of a syntax structure for determining an asymmetric ternary tree structure.

Upon determining that the current block is split by an asymmetric ternary tree structure at nodes 1916, 1920, 2014, and 2018, and there are two or more asymmetric ternary tree structures allowed for the current block, the asymmetric ternary tree structure of the current block may be selected from among the two or more asymmetric ternary tree structures according to the asymmetric ternary tree structure determination method of FIG. 22.

According to node 2202, the asymmetric ternary tree direction of the current block is determined. The determination of the node 2202 may be made according to an asymmetric ternary tree direction flag (ATT direction flag) or characteristics of the current block. When the asymmetric ternary tree direction flag indicates 0, it may be determined that the current block is split according to an asymmetric ternary tree structure in the right or up direction. Conversely, when the asymmetric ternary tree direction flag indicates 1, it may be determined that the current block is split according to an asymmetric ternary tree structure in the left or down direction. In some embodiments, a tree structure indicated by a symbol of the asymmetric ternary tree direction flag may be set opposite to the asymmetric ternary tree direction flag of FIG. 22.

If the split direction is vertical and the asymmetric ternary tree direction is right, the current block may be split according to the vertical right ternary tree. In addition, if the split direction is vertical and the quadrangle binary tree direction is left, the current block may be split according to the vertical left ternary tree. If the split direction is horizontal and the quadrangle binary tree direction is up, the current block may be split according to the horizontal up ternary tree. In addition, if the split direction is horizontal and the quadrangle binary tree direction is down, the current block may be split according to the horizontal down ternary tree.

Some of the asymmetric ternary tree structures may not be used for block splitting. Therefore, in one embodiment of image encoding and decoding, if only a specific asymmetric ternary tree direction is applied to each split direction, node 2202 may be omitted.

In addition, even if the asymmetric ternary tree structure is included as an encoding tool in the embodiment, upon determining that a specific asymmetric ternary tree structure is not allowed in an upper data unit such as a sequence parameter set, a picture parameter set, a slice header, a coding tree unit, etc., the asymmetric ternary tree structure that is not allowed may be excluded from the block splitting of the current block. In addition, depending on the characteristics (size, shape, color component, slice type, etc.) of the current block, the asymmetric ternary tree structure that is not allowed may be excluded from the block splitting of the current block.

The current block may be split according to the asymmetric ternary tree structure, and the sub blocks determined by the splitting of the current block may be encoded or decoded without being additionally split.

To summarize the above disclosure, the current block may be split according to the tree structure described in FIGS. 4 to 7. Then, a prediction and/or transform process may be performed on the split sub block, or the sub block may be split again. If transform is performed on the sub block, the residual signal reordering described in FIGS. 9 to 18 may be performed before the transform. According to the syntax structure of FIGS. 19 to 22, the tree structure for the splitting of the current block may be determined.

Figure 23:
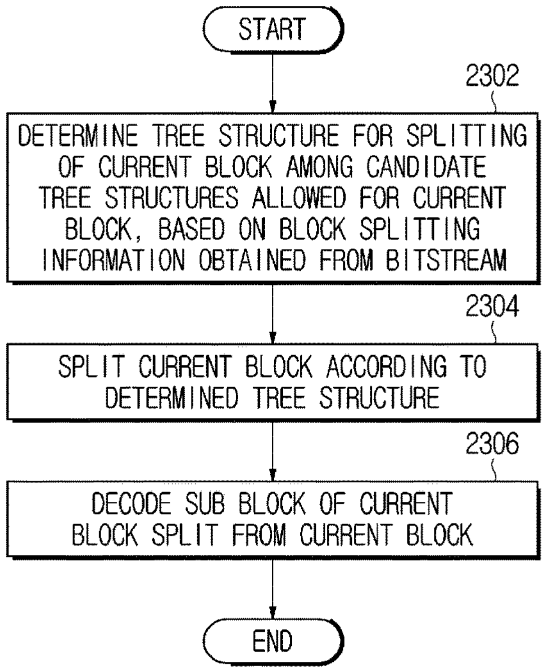
FIG. 23 shows an embodiment of a video decoding method to which a tree structure determination method for block splitting is applied.

FIG. 23 shows an embodiment of a video decoding method to which a tree structure determination method for block splitting is applied.

In step 2302, based on block splitting information obtained from a bitstream, a tree structure for splitting of a current block is determined among candidate tree structures allowed for the current block.

The candidate tree structures include a geometric splitting tree structure, and the geometric splitting tree structure may include at least one of a triangle quad tree structure, a geometric binary tree structure, and an asymmetric ternary tree structure. In addition, the geometric binary tree structure may include a triangle binary tree structure and a quadrangle binary tree structure. The triangle binary tree structure may include a vertical triangle binary tree structure and a horizontal triangle binary tree structure. In addition, the quadrangle binary tree structure may include a vertical right quadrangle binary tree structure, a vertical left quadrangle binary tree structure, a horizontal up quadrangle binary tree structure, and a horizontal down quadrangle binary tree structure. In addition, the asymmetric ternary tree structure may include a vertical right ternary tree structure, a vertical left ternary tree structure, a horizontal up ternary tree structure, and a horizontal down ternary tree structure.

The block splitting information may include a triangle quad tree flag indicating a method of splitting the current block among the rectangle quad tree structure and the triangle quad tree structure, a geometric binary tree flag indicating a method of splitting the current block among the rectangle binary tree structure and the geometric binary tree structure, and an asymmetric ternary tree flag indicating a method of splitting the current block among the rectangle ternary tree structure and the asymmetric ternary tree structure.

The block splitting information includes a quad tree flag indicating a method of splitting the current block among a quad tree structure and a multi-type tree structure, and the triangle quad tree flag may be obtained from the bitstream when the quad tree flag indicates that the method of splitting the current block is a quad tree structure.

The block splitting information includes a binary tree flag indicating a method of splitting the current block among a binary tree structure and a ternary tree structure, and the geometric binary tree flag may be obtained from the bitstream when the binary tree flag indicates that the method of splitting the current block is a binary tree structure, and the asymmetric ternary tree flag may be obtained from the bitstream when the binary tree flag indicates that the method of splitting the current block is a ternary tree structure.

The block splitting information may further include a GBT shape flag indicating the method of splitting the current block among a triangle binary tree structure and a quadrangle binary tree structure when the geometric binary tree flag indicates that the method of splitting the current block is a geometric binary tree structure, and may further include a quadrangle binary tree direction flag indicating the quadrangle binary tree direction of the current block when the GBT shape flag indicates that the method of splitting the current block is a quadrangle binary tree structure.

The block splitting information may further include an asymmetric ternary tree direction flag indicating an asymmetric ternary tree direction of the current block, when the asymmetric ternary tree flag indicates that the method of splitting the current block is an asymmetric ternary tree structure.

The block splitting information may further include a split direction flag indicating the split direction of the current block among the vertical direction and the horizontal direction, when the binary tree structure or the ternary tree structure is applied to the current block. When the binary tree structure is applied to the current block, the binary tree structure applied to the current block may be determined according to the split direction of the current block, and when the ternary tree structure is applied to the current block, the ternary tree structure applied to the current block may be determined according to the split direction of the current block.

In the upper data unit of the current block, upon determining that the geometric splitting tree structure is not allowed for the current block, or if the geometric splitting tree structure is not applied to the current block based on at least one of the size, shape, color component, and slice type of the current block, the triangle quad tree flag, the geometric binary tree flag, and the asymmetric ternary tree flag may not be obtained from the bitstream.

In step 2304, the current block is split according to the determined tree structure.

If the tree structure of the current block is a triangle quad tree structure, the current block may be split into four triangle blocks with the same size. If the tree structure of the current block is a triangle binary tree structure, the current block may be split into two triangle blocks with the same size. If the tree structure of the current block is a quadrangle binary tree structure, the current block may be split into two quadrangle blocks, not rectangle. If the tree structure of the current block is an asymmetric ternary tree structure, the current block may be split into two triangle blocks and one rectangle block.

In step 2306, the sub block of the current block split from the current block is decoded.

In response to the geometric splitting tree structure being determined to be the tree structure of the current block, the sub block may no longer be split.

In decoding the sub block of the current block, if the current block is split according to the geometric splitting tree structure, the method may include a step of determining a plurality of transform regions from the current block according to a region of the sub block, a step of reordering residual signals of a plurality of transform blocks corresponding to the current block in the plurality of transform regions, and a step of determining a residual block including residual signals of the current block by combining the plurality of transform regions.

Here, the step of reordering the residual signals of the plurality of transform blocks corresponding to the current block in the plurality of transform regions may include the step of scanning the residual signals of the plurality of transform blocks in a predetermined first scan order, and the step of reordering the scanned residual signals in the plurality of transform regions in a predetermined second scan order.

The predetermined first scan order may be determined to be one of a vertical zigzag scan, a horizontal zigzag scan, and a diagonal zigzag scan, and the predetermined second scan order may be determined to be one of a vertical zigzag scan, a horizontal zigzag scan, and a diagonal zigzag scan.

Figure 24:
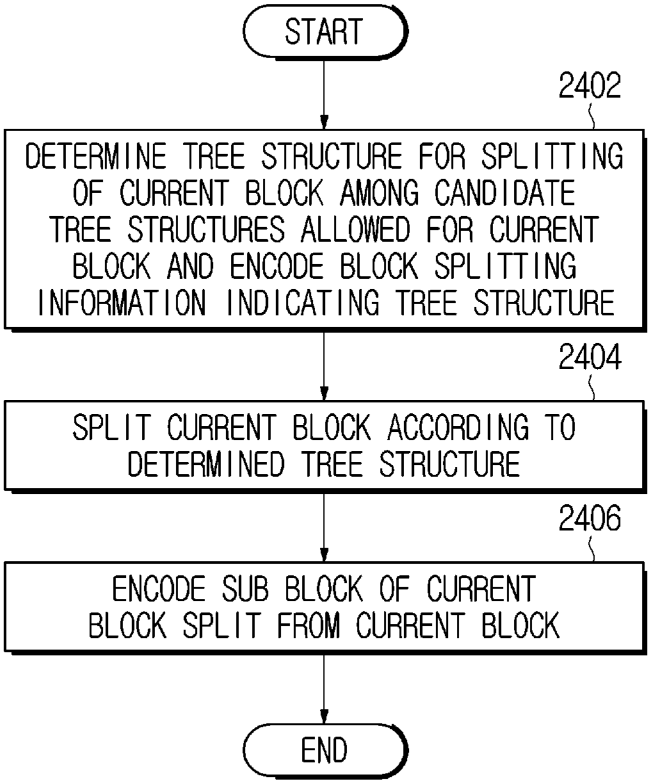
FIG. 24 shows an embodiment of a video encoding method to which a tree structure determination method for block splitting is applied.

FIG. 24 shows an embodiment of a video encoding method to which a tree structure determination method for block splitting is applied.

In step 2402, among candidate tree structures allowed for a current block, a tree structure for splitting of the current addition, block may be determined. In block splitting information representing the tree structure may be encoded.

The candidate tree structure is the same as described in step 2302. In addition, the syntax elements included in the block splitting information are the same as described in step 2302. However, in the encoding step, syntax elements are generated, and the syntax elements are described as follows. The triangle quad tree flag may be encoded and included in a bitstream when the quad tree flag indicates that the method of splitting the current block is a quad tree structure. In addition, the geometric binary tree flag may be encoded and included in the bitstream when the binary tree flag indicates that the method of splitting the current block is a binary tree structure. In addition, the asymmetric ternary tree flag may be encoded and included in the bitstream when the asymmetric ternary tree flag indicates that the method of splitting the current block is a ternary tree structure.

When the GBT shape flag indicates that the method of splitting the current block is a quadrangle binary tree structure, a quadrangle binary tree direction flag indicating the quadrangle binary tree direction of the current block may be encoded and included in the bitstream.

When the asymmetric ternary tree flag indicates that the method of splitting the current block is an asymmetric ternary tree structure, an asymmetric ternary tree direction flag indicating the asymmetric ternary tree direction of the current block may be encoded and included in the bitstream.

When the binary tree structure or the ternary tree structure is applied to the current block, the split direction flag indicating the split direction of the current block among the vertical direction and the horizontal direction may be encoded and included in the bitstream.

In step 2404, the current block is split according to the determined tree structure. As described with respect to step 2304, the current block may be split according to the block splitting method of each tree structure in step 2404.

In step 2406, the sub block of the current block split from the current block may be encoded.

In response to the geometric splitting tree structure being determined to be the tree structure of the current block, the sub block may no longer be split.

In encoding the sub block of the current block, if the current block is split according to the geometric splitting tree structure, the step of determining a plurality of transform regions from the current block according to the region of the sub block, the step of reordering residual signals of the plurality of transform regions in a plurality of transform blocks corresponding to the current block, and the step of performing transform and quantization on the plurality of transform blocks may be included.

Here, the step of reordering residual signals of the plurality of transform regions corresponding to the current block in the plurality of transform blocks may include the step of scanning the residual signals of the plurality of transform regions in a predetermined second scan order, and the step of reordering the scanned residual signals in the plurality of transform blocks in a predetermined first scan order.

The predetermined first scan order may be determined to be one of a vertical zigzag scan, a horizontal zigzag scan, and a diagonal zigzag scan, and the predetermined second scan order may be determined to be one of a vertical zigzag scan, a horizontal zigzag scan, and a diagonal zigzag scan.

Figure 25:
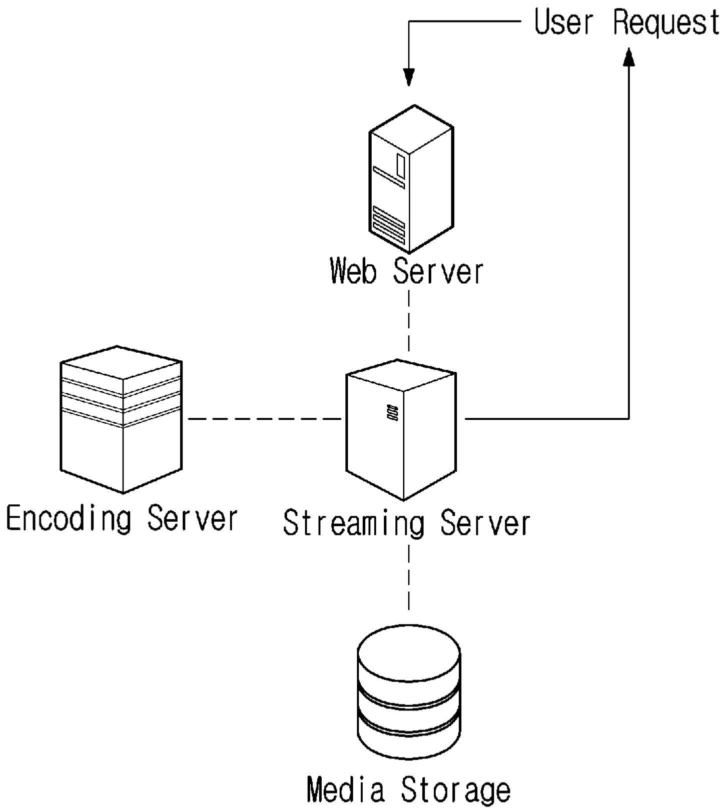
FIG. 25 exemplarily illustrates a content streaming system to which an embodiment according to the present invention is applicable.

FIG. 25 exemplarily illustrates a content streaming system to which an embodiment according to the present invention is applicable.

As illustrated in FIG. 25, a content streaming system to which an embodiment of the present invention is applied may largely include an encoding server, a streaming server, a web server, a media storage, a user device, and a multimedia input device.

The encoding server compresses content received from multimedia input devices such as smartphones, cameras, CCTVs, etc. into digital data to generate a bitstream and transmits it to the streaming server. As another example, if multimedia input devices such as smartphones, cameras, CCTVs, etc. directly generate a bitstream, the encoding server may be omitted.

The bitstream may be generated by an image encoding method and/or an image encoding apparatus to which an embodiment of the present invention is applied, and the streaming server may temporarily store the bitstream in the process of transmitting or receiving the bitstream.

The streaming server transmits multimedia data to a user device based on a user request via a web server, and the web server may act as an intermediary that informs the user of any available services. When a user requests a desired service from the web server, the web server transmits it to the streaming server, and the streaming server may transmit multimedia data to the user. At this time, the content streaming system may include a separate control server, and in this case, the control server may control commands/responses between devices within the content streaming system.

The streaming server may receive content from a media storage and/or an encoding server. For example, when receiving content from the encoding server, the content may be received in real time. In this case, in order to provide a smooth streaming service, the streaming server may store the bitstream for a certain period of time.

Examples of the user devices may include mobile phones, smartphones, laptop computers, digital broadcasting terminals, personal digital assistants (PDAs), portable multimedia players (PMPs), navigation devices, slate PCs, tablet PCs, ultrabooks, wearable devices (e.g., smartwatches, smart glasses, HMDs), digital TVs, desktop computers, digital signage, etc.

Each server in the above content streaming system may be operated as a distributed server, in which case data received from each server may be distributed and processed.

The above embodiments may be performed in the same or corresponding manner in the encoding apparatus and the decoding apparatus. In addition, an image may be encoded/decoded using at least one or a combination of at least one of the above embodiments.

The order in which the above embodiments are applied may be different in the encoding apparatus and the decoding apparatus. Alternatively, the order in which the above embodiments are applied may be the same in the encoding apparatus and the decoding apparatus.

The above embodiments may be performed for each of the luma and chroma signals. Alternatively, the above embodiments for the luma and chroma signals may be performed identically. In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field.

A bitstream generated by the encoding method according to the above embodiment may be stored in a non-transitory computer-readable recording medium. In addition, a bitstream stored in the non-transitory computer-readable recording medium may be decoded by the decoding method according to the above embodiment.

Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used in an apparatus for encoding/decoding an image and a recording medium for storing a bitstream.

The invention claimed is:

1. A video decoding method comprising:

determining a tree structure for splitting a current block among candidate tree structures allowed for the current block, based on a block splitting information obtained from a bitstream;

splitting the current block according to the determined tree structure; and decoding a sub block of the current block split from the current block, wherein the candidate tree structures comprise a geometric splitting tree structure, and the geometric splitting tree structure comprises at least one of a triangle quad tree structure, a geometric binary tree structure or an asymmetric ternary tree structure;

wherein, in response to the tree structure of the current block being the asymmetric ternary tree structure, the current block is split into two triangle blocks and one parallelogram block by two split lines;

wherein each of the two split lines connects one vertex of the current block and a center point of one boundary of the current block not adjacent to the vertex, and wherein the two split lines are parallel to each other; and wherein, based on a size of the current block being 2N×2N, an area of the parallelogram block is N×2N and an area of each of the two triangle blocks is (N×2N)/2.

2. The video decoding method of claim 1, wherein, when the tree structure of the current block is a triangle quad tree structure, the current block is split into four rectangle blocks with the same size.

3. The video decoding method of claim 1, wherein the geometric binary tree structure comprises a triangle binary tree structure and a rectangle binary tree structure.

4. The video decoding method of claim 3, wherein, when the tree structure of the current block is a triangle binary tree structure, the current block is split into two triangle blocks with the same size.

5. The video decoding method of claim 3, wherein, when the tree structure of the current block is a rectangle binary tree structure, the current block is split into two quadrangle blocks other than rectangle blocks.

6. The video decoding method of claim 1, wherein the block splitting information comprises:

a geometric binary tree flag indicating a method of splitting the current block among a rectangle binary tree structure and a geometric binary tree structure, and an asymmetric ternary tree flag indicating a method of splitting the current block among a rectangle ternary tree structure and an asymmetric ternary tree structure.

7. The video decoding method of claim 6, wherein the block splitting information comprises a binary tree flag indicating the method of splitting the current block among a binary tree structure and a ternary tree structure, wherein the geometric binary tree flag is obtained from the bitstream, when the binary tree flag indicates that the method of splitting the current block is a binary tree structure, and wherein the asymmetric ternary tree flag is obtained from the bitstream, when the binary tree flag indicates that the method of splitting the current block is a ternary tree structure.

8. The video decoding method of claim 6, wherein the block splitting information further comprises:

a GBT shape flag indicating the method of splitting the current block among a triangle binary tree structure and a rectangle binary tree structure, when the geometric binary tree flag indicates that the method of splitting the current block is a geometric binary tree structure, and a rectangle binary tree direction flag indicating a rectangle binary tree direction of the current block, when the GBT shape flag indicates that the method of splitting the current block is a rectangle binary tree structure.

9. The video decoding method of claim 6, wherein the block splitting information further comprises an asymmetric ternary tree direction flag indicating an asymmetric ternary tree direction of the current block, when the asymmetric ternary tree flag indicates that the method of splitting the current block is an asymmetric ternary tree structure.

10. The video decoding method of claim 6, wherein the block splitting information further comprises a split direction flag indicating a split direction of the current block among a vertical direction and a horizontal direction, when the binary tree structure or the ternary tree structure is applied to the current block, wherein the binary tree structure applied to the current block is determined according to the split direction of the current block, when the binary tree structure is applied to the current block, and wherein the ternary tree structure applied to the current block is determined according to the split direction of the current block, when the ternary tree structure is applied to the current block.

11. The video decoding method of claim 6, wherein, upon determining that the geometric splitting tree structure is not allowed for the current block in an upper data unit of the current block or the geometric splitting tree structure is not applied to the current block based on at least one of a size, shape, color component or slice type of the current block, the triangle quad tree flag, the geometric binary tree flag and the asymmetric ternary tree flag are not obtained from the bitstream.

12. The video decoding method of claim 1, wherein the decoding the sub block of the current block comprises:

determining a plurality of transform regions from the current block according to a region of the sub block, when the current block is split according to the geometric splitting tree structure;

reordering residual signals of a plurality of transform blocks corresponding to the current block in the plurality of transform regions; and determining a residual block including the residual signals of the current block by combining the plurality of transform regions.

13. The video decoding method of claim 12, wherein the reordering the residual signals of the plurality of transform blocks corresponding to the current block in the plurality of transform regions comprises:

scanning the residual signals of the plurality of transform blocks in a predetermined first scan order; and reordering the scanned residual signals in the plurality of transform regions in a predetermined second scan order.

14. The video decoding method of claim 13, wherein the predetermined first scan order is determined to be one of a vertical zigzag scan, a horizontal zigzag scan and a diagonal zigzag scan, and wherein the predetermined second scan order is determined to be one of a vertical zigzag scan, a horizontal zigzag scan and a diagonal zigzag scan.

15. The video decoding method of claim 1, wherein the sub block is not split in response to the geometric splitting tree structure being determined to be the tree structure of the current block.

16. A video encoding method comprising:

determining a tree structure for splitting a current block among candidate tree structures allowed for the current block and encoding block splitting information indicating the tree structure;

splitting the current block according to the determined tree structure; and encoding a sub block of the current block split from the current block, wherein the candidate tree structures comprise a geometric splitting tree structure, and the geometric splitting tree structure comprises at least one of a triangle quad tree structure, a geometric binary tree structure or an asymmetric ternary tree structure;

wherein, in response to the tree structure of the current block being the asymmetric ternary tree structure, the current block is split into two triangle blocks and one parallelogram block by two split lines;

wherein each of the two split lines connects one vertex of the current block and a center point of one boundary of the current block not adjacent to the vertex, and wherein the two split lines are parallel to each other; and wherein, based on a size of the current block being 2N×2N, an area of the parallelogram block is N×2N and an area of each of the two triangle blocks is (N×2N)/2.

17. A bitstream transmission method of transmitting a bitstream, comprising:

generating the bitstream by encoding video data by a video encoding method; and transmitting the bitstream to an image decoding apparatus;

wherein the video encoding method comprises:

determining a tree structure for splitting a current block among candidate tree structures allowed for the current block and encoding block splitting information indicating the tree structure;

splitting the current block according to the determined tree structure; and encoding a sub block of the current block split from the current block, wherein the candidate tree structures comprise a geometric splitting tree structure, and the geometric splitting tree structure comprises at least one of a triangle quad tree structure, a geometric binary tree structure or an asymmetric ternary tree structure;

wherein, in response to the tree structure of the current block being the asymmetric ternary tree structure, the current block is split into two triangle blocks and one parallelogram block by two split lines;

wherein each of the two split lines connects one vertex of the current block and a center point of one boundary of the current block not adjacent to the vertex, and wherein the two split lines are parallel to each other; and wherein, based on a size of the current block being 2N×2N, an area of the parallelogram block is N×2N and an area of each of the two triangle blocks is (N×2N)/2.

* * * * *